Dec. 1, 1936.  A. B. TEWES  2,062,844
BAKED LOAF SLICING AND TRAYING MACHINE
Filed Jan. 4, 1932  8 Sheets-Sheet 1
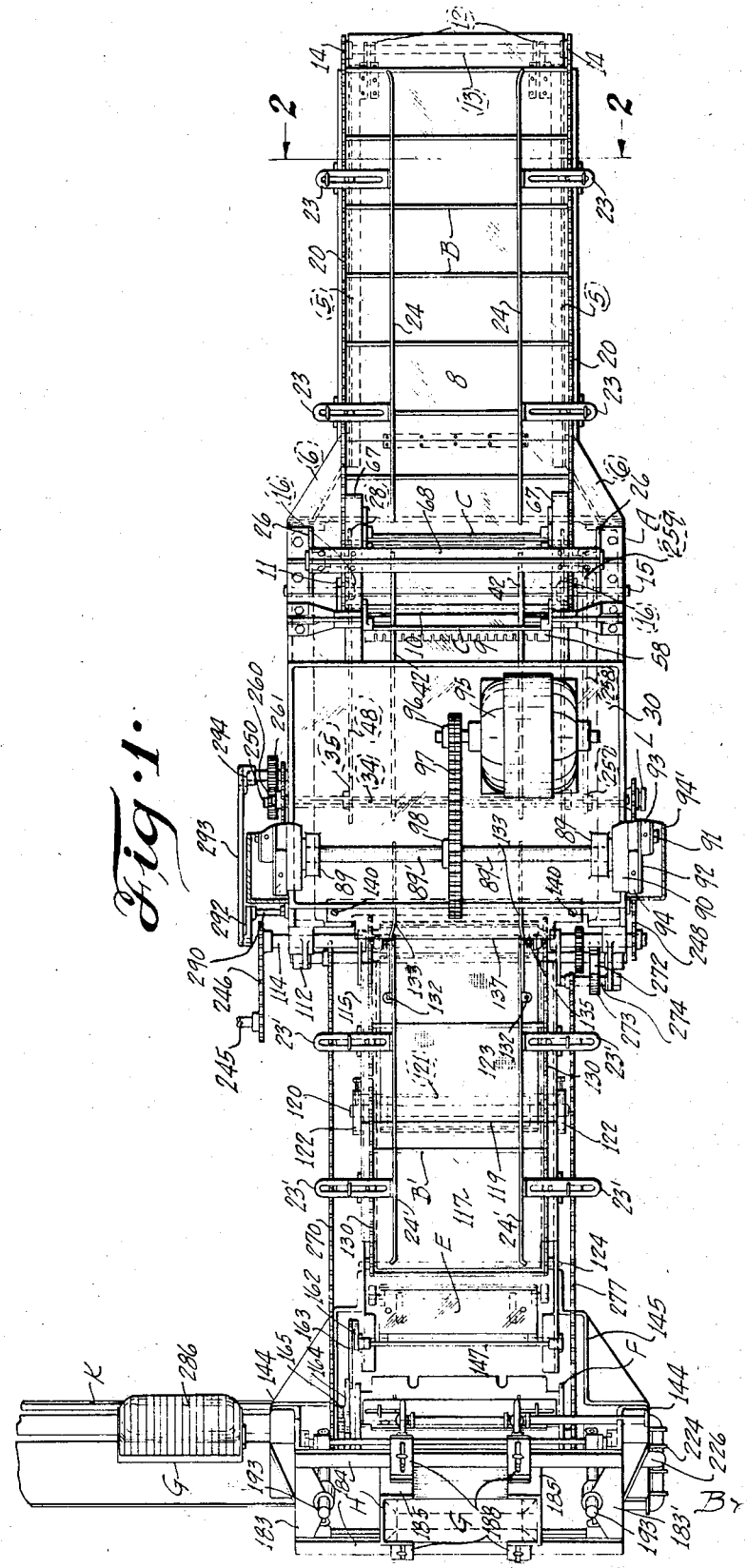
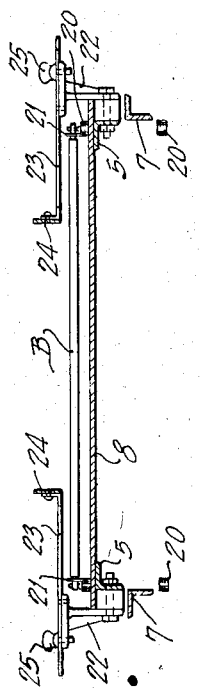
INVENTOR
Anthony B. Tewes.
BY
ATTORNEY

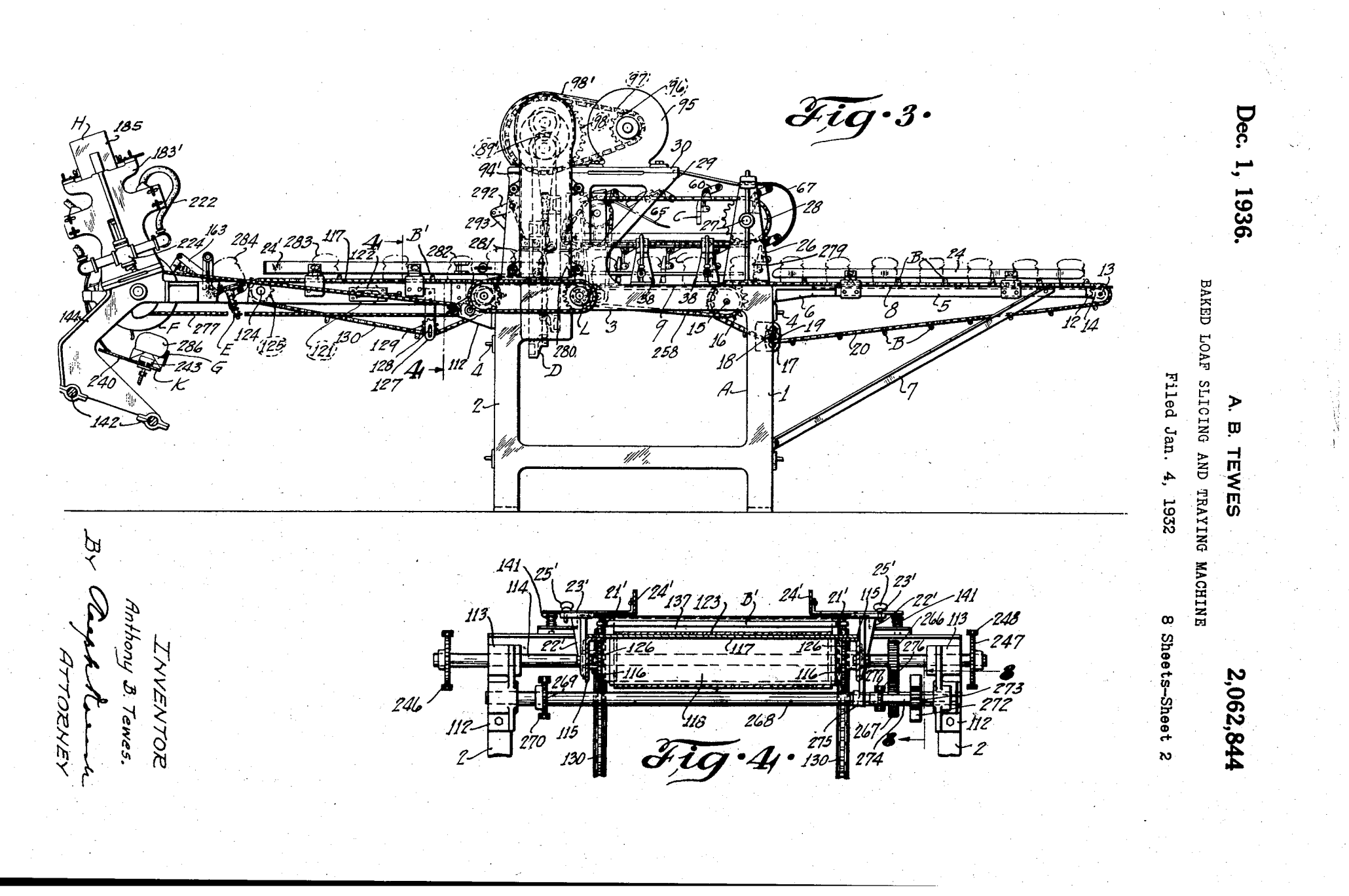

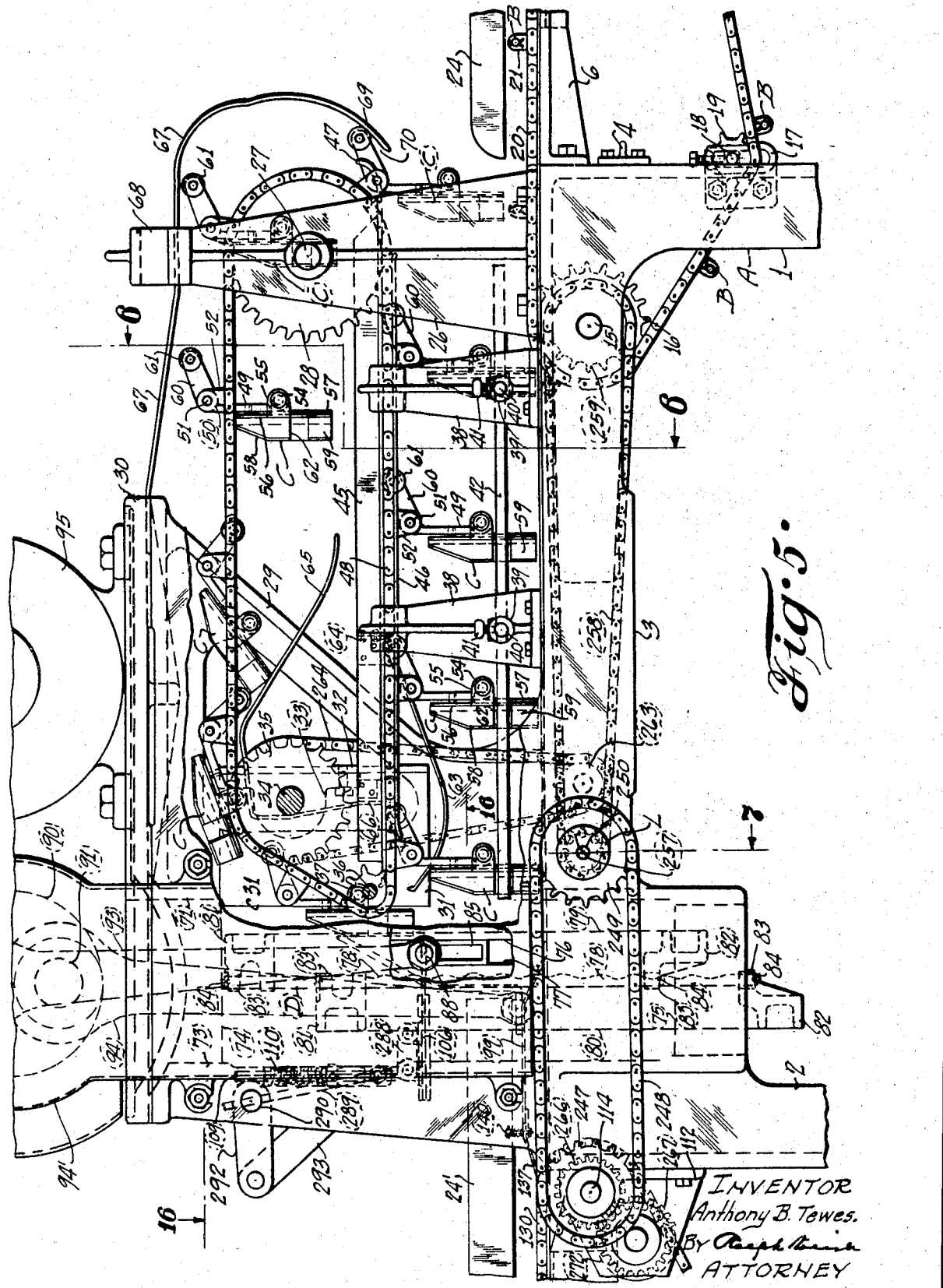

Dec. 1, 1936.  A. B. TEWES  2,062,844
BAKED LOAF SLICING AND TRAYING MACHINE
Filed Jan. 4, 1932  8 Sheets-Sheet 4
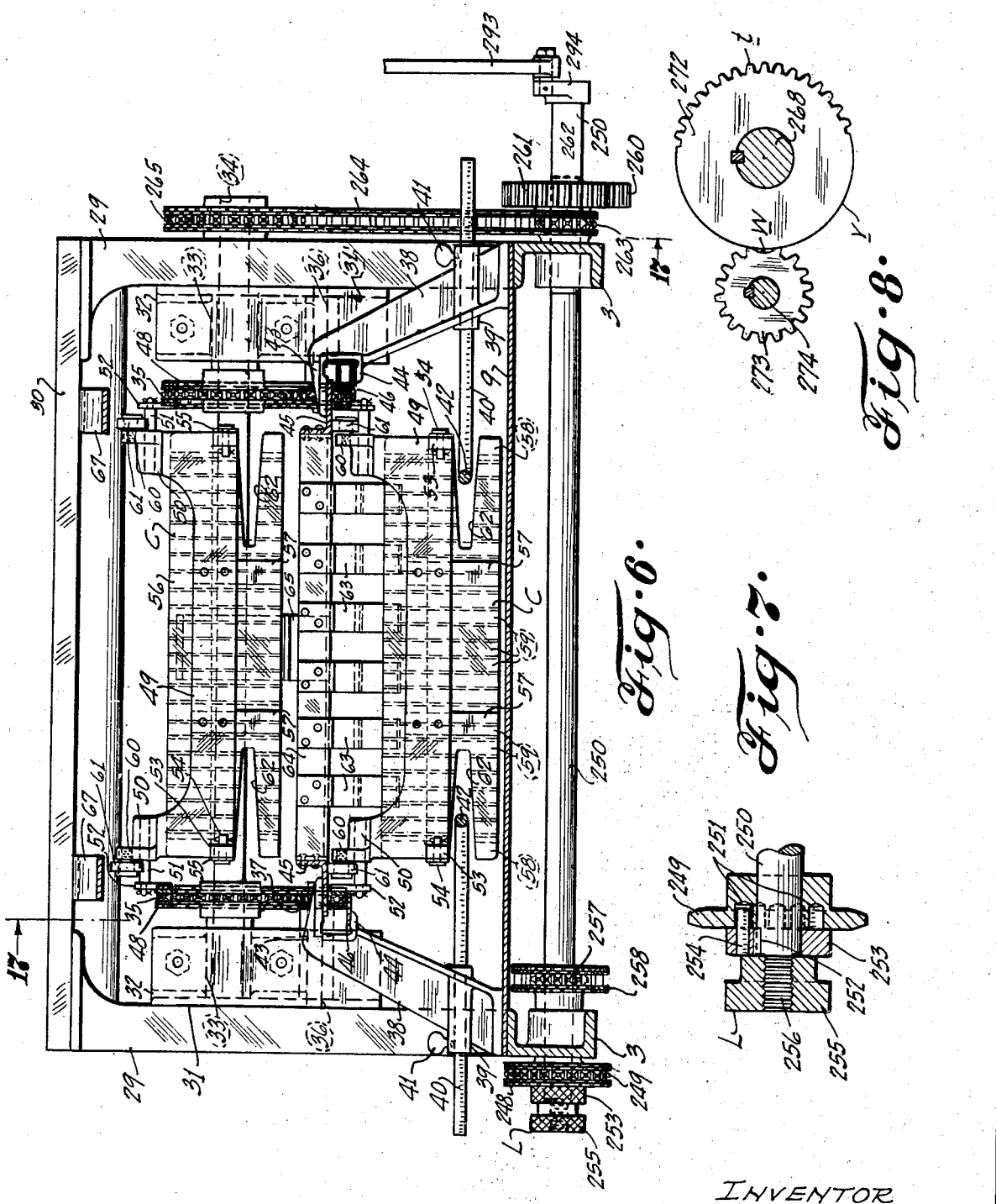
INVENTOR
Anthony B. Tewes.
BY
ATTORNEY

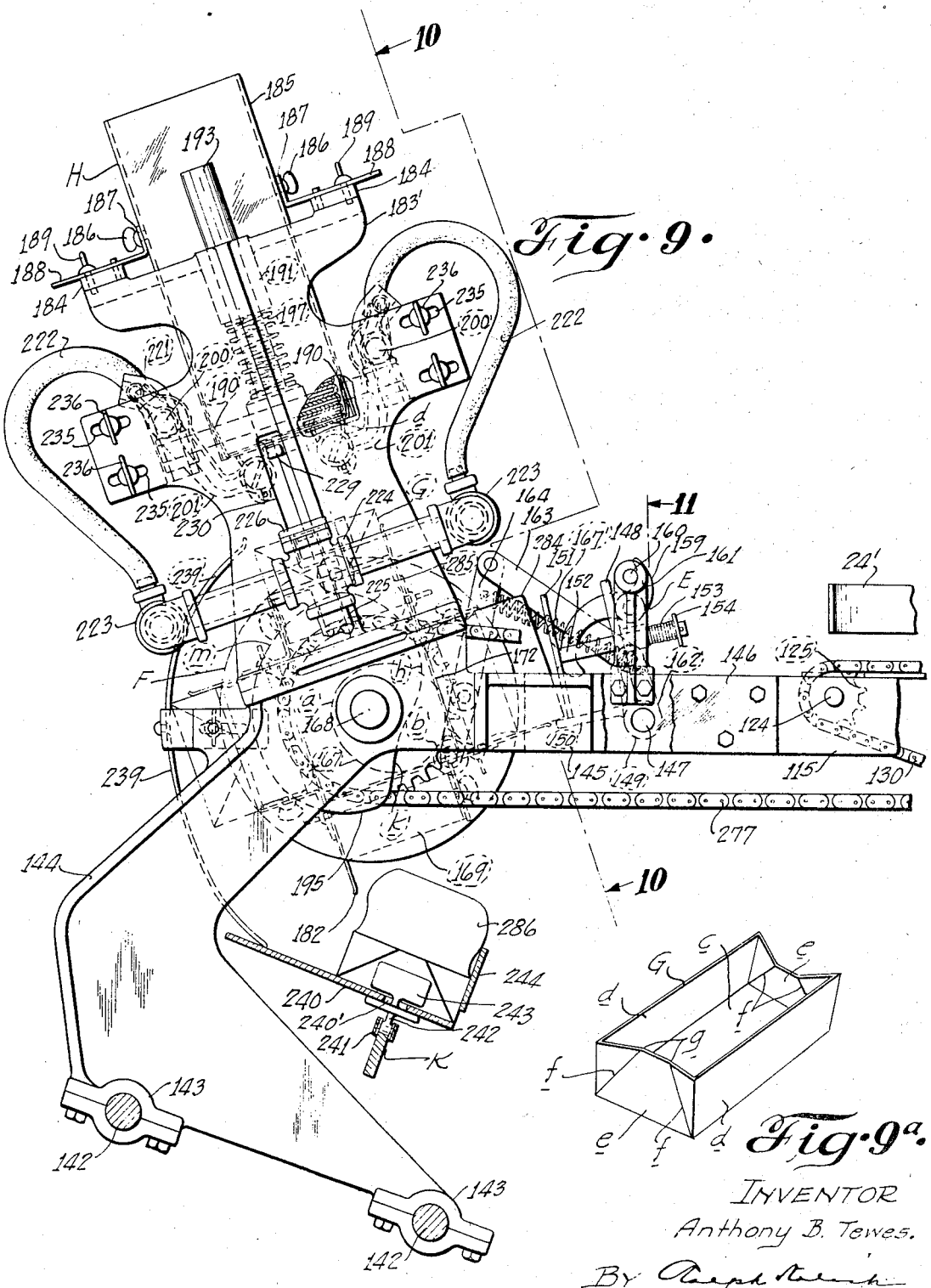

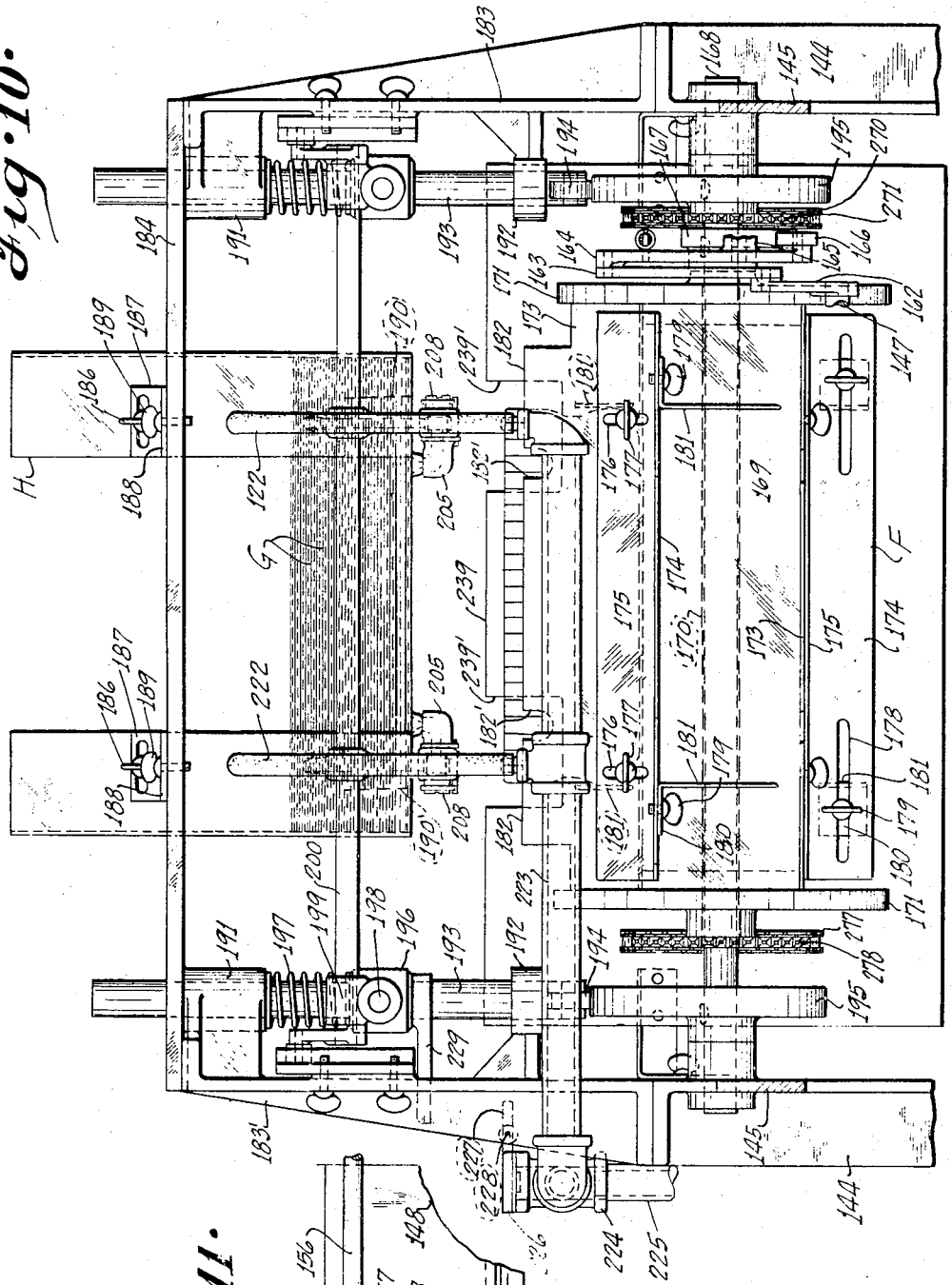

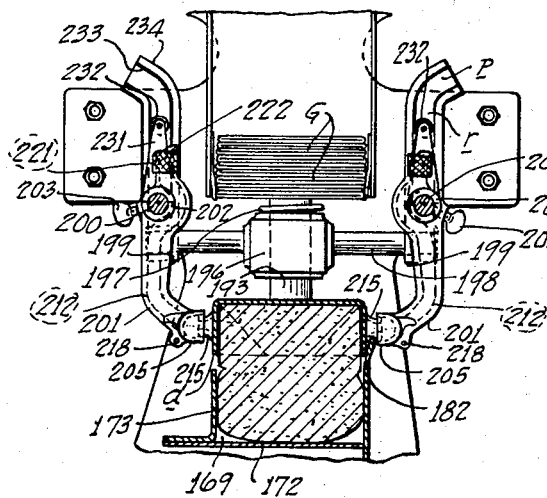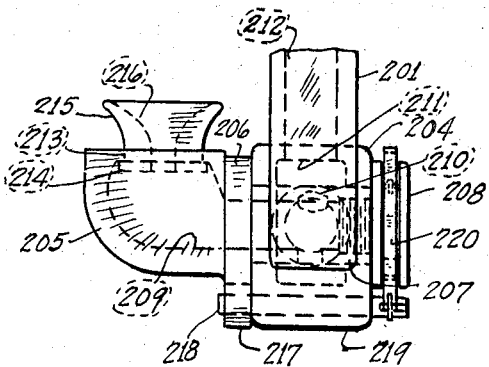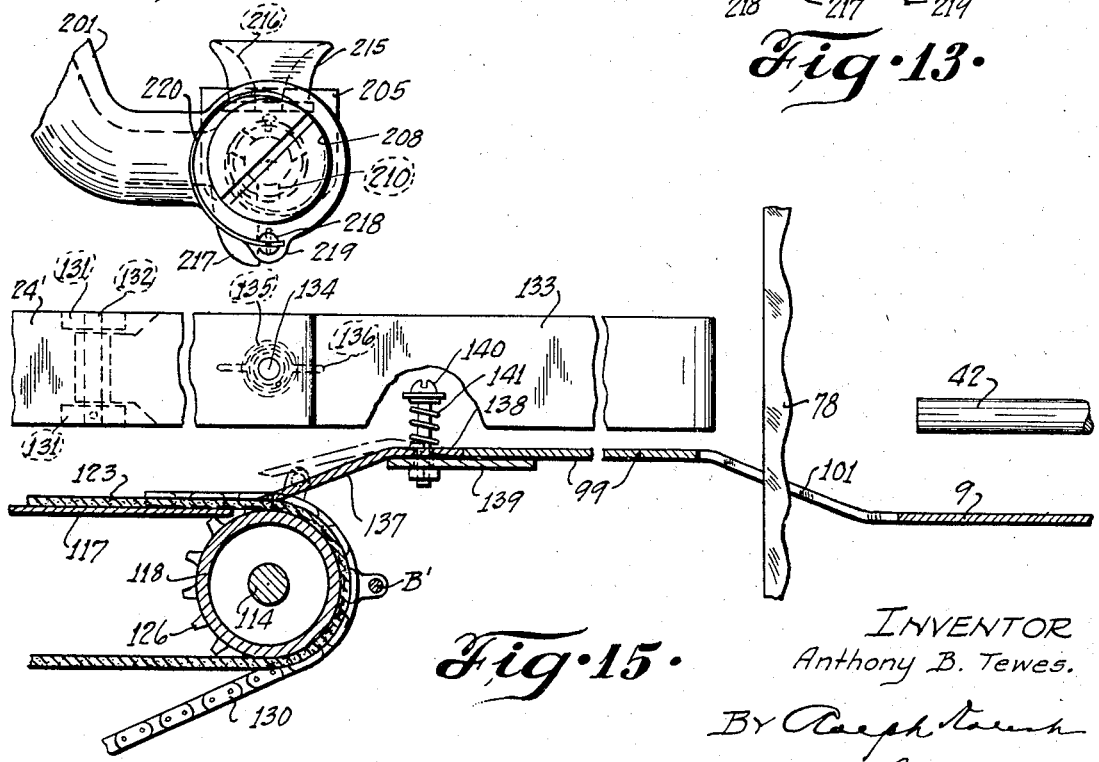

Dec. 1, 1936.  A. B. TEWES  2,062,844
BAKED LOAF SLICING AND TRAYING MACHINE
Filed Jan. 4, 1932  8 Sheets-Sheet 8

INVENTOR
Anthony B. Tewes.
BY
ATTORNEY

Patented Dec. 1, 1936

2,062,844

UNITED STATES PATENT OFFICE 2,062,844

BAKED-LOAF SLICING AND TRAYING MACHINE

Anthony B. Tewes, St. Louis, Mo., assignor to Papendick, Inc., St. Louis, Mo., a corporation of Missouri Application January 4, 1932, Serial No. 584,656

31 Claims. (Cl. 146—153)

This invention relates to a certain new and useful improvement in machines for slicing and traying baked loaf-bread.

United States Letters Patent No. 1,722,338 of July 30, 1929, to Gustav C. Papendick for sliced baked-loaf package and packaging to which reference is made, describes a method of preparing a sliced baked loaf of bread for delivery to the user in unmutilated, attractive and palatable condition, wherein the loaf is cut into substantially uniform slices then disposed for packaging in a tray of stiff, resilient material of substantially the shape and dimensions of the original loaf. The thus sliced and trayed baked-loaf is then packaged in a wrapper of substantially moisture and air-proof material for retaining the same in assembled condition and for preserving the freshness of the sliced loaf.

My invention has for its prime object the provision of a machine for efficiently, economically, and substantially automatically slicing and traying baked loaves of bread for presentation thereof to a suitable wrapping machine for applying a wrapper therearound.

And with the above and other objects in view, my invention resides in the novel features of form, construction, arrangement and combination of parts hereinafter described and pointed out in the claims.

In the accompanying drawings (eight sheets), Figure 1 is a top-plan view of a baked-loaf slicing and traying machine embodying my present invention, fragmentally also showing a trough for delivering the sliced and trayed loaves to an associated wrapping-machine;

Figure 2 is an enlarged transverse sectional view through the loading platform of the machine, taken approximately along the line 2—2, Figure 1;

Figure 3 is a side elevational view of the machine taken from the side of the machine opposite to the intended position of the associated wrapping-machine, a series of baked loaves being shown in dot-dash lines as in progress through the machine;

Figure 4 is an enlarged transverse sectional view through the delivery-table of the machine, taken approximately along the line 4—4, Figure 3;

Figure 5 is an enlarged fragmentary side-elevational view of the central portion of the machine, showing the feeding and slicing mechanisms thereof, parts being broken away for disclosing the interior arrangement;

Figure 6 is a transverse sectional view taken approximately along the line 6—6, Figure 5, fragmentally also showing a portion of the hold-down actuating mechanism;

Figure 7 is a fragmentary sectional view of the indexing device of the machine, taken approximately along the line 7, Figure 5;

Figure 8 is a sectional view of the intermittent motion mechanism for driving the loaf-inverting wheel of the machine, taken approximately along the line 8—8, Figure 4;

Figure 9 is an enlarged fragmentary side-elevational view of one end portion of the machine, showing the loaf-inverting and tray-applying mechanisms and the associated roll-over apparatus of the machine, portions of the wrapping-machine mechanism being shown in section and a series of sliced and trayed loaves being shown in progress through the mechanism;

Figure 9a is an enlarged detailed perspective view of the sliced-loaf-containing tray;

Figure 10 is a front elevational view of the apparatus of Figure 9, taken approximately along the line 10—10, Figure 9, the lower portion of the side frames being broken away and merely a fragmentary portion of the roll-over apparatus being shown;

Figure 11 is a fragmentary front elevational partly sectional view, of one corner of the roll-over apparatus, taken approximately along the line 11, Figure 9;

Figure 12 is a fragmentary sectional view through a portion of the tray-applying apparatus and its associated loaf-inverting wheel, illustrating the application of an expanded tray to a wheel-inverted loaf;

Figure 13 is an enlarged fragmentary detail view of the swivel-elbow and its carried suction cup of one of the tray-applying suction arms;

Figure 14 is an end view of the apparatus of Figure 13;

Figure 15 is an enlarged sectional detail and fragmentary diagrammatic view of that portion of the machine associated with the slicing mechanism thereof, illustrating more particularly the means for guiding and supporting the loaves to and through the slicing knives and for depositing the sliced loaves onto the delivery table and its associated loaf transporting members;

Figure 16:
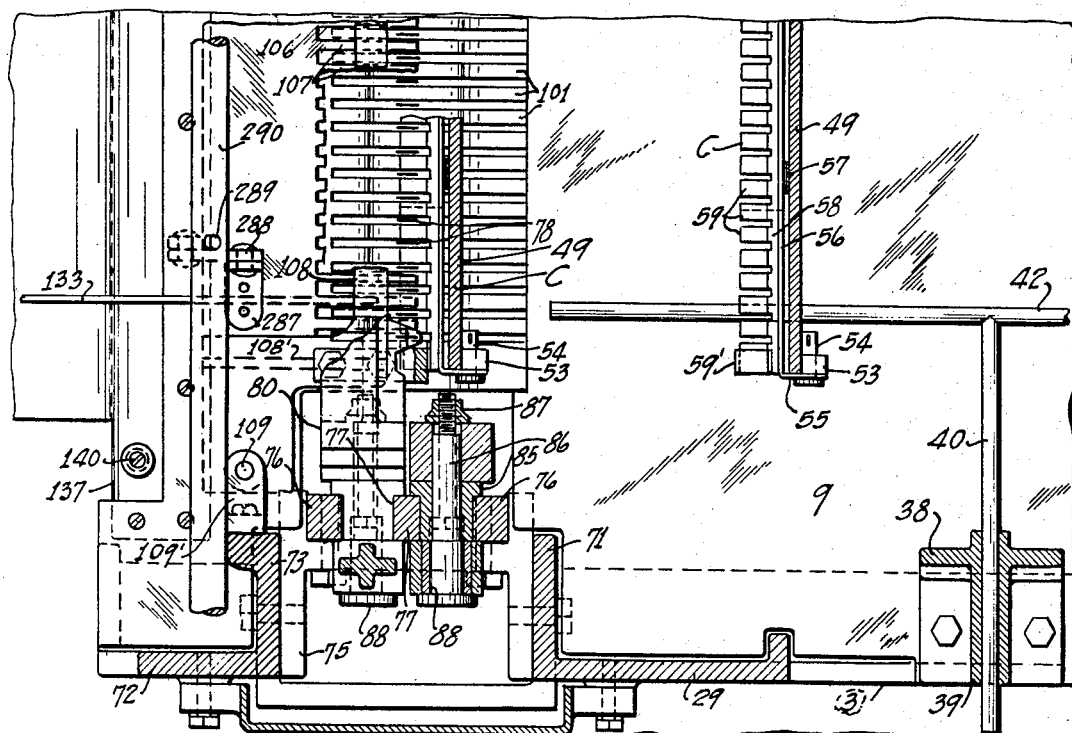
Figure 16 is a half-sectional plan view of the rear portion of the apparatus, taken generally along the line 16—16, Figure 5.

Referring now more in detail and by reference characters to the drawings, which illustrate a preferred embodiment of my invention, A designates the main frame of the machine, which preferably comprises a pair of substantially rectangular side-frames each including a front-leg 1 and rear-leg 2 connected integrally by a horizontal top-rail 3, the side-frames being suitably spaced and rigidly tied together in approximately parallel relation by transverse or cross members 4, as best seen in Figures 1 and 3.

Extending forwardly from the main frame A approximately flush with the top-rails 3, is a loading table and conveyer-frame comprising a pair of laterally spaced horizontally disposed frame-members 5 preferably of angle section, whose rear-ends are suitably secured to bracket-members 6 fixed on the respective front-legs 1 and whose front-ends are supported by respective obliquely disposed brace-members 7 attached at their lower end also to the frame front-legs 1, as best seen in Figure 3.

Supported on and between the frame-members 5, is a loaf-loading plate or platform 8, and supported by and between the frame top-rails 3 in flushwise substantially contiguous relation with the rear end of the platform 8, is a feed-plate 9 provided at an intermediate point with a transverse slot 10 having communicating forwardly-extending sprocket-notches 11 at its opposite ends, as best seen in Figure 1.

At the front end of the conveyer-frame members 5, are forwardly projected bearings 12, journaled in which is a transverse shaft 13 carrying a pair of spaced tail-sprockets 14; and suitably journaled at its opposite ends in the frame-rails 3 under and at the front end of the plate 9, is a transverse shaft 15 carrying a pair of spaced sprockets 16 working rimwise through the respective notches 11 and aligned respectively with the tail-sprockets 14.

Mounted on the front-frame legs 1 below the plane of the plates 8, 9, is a pair of so-called take-up bearings 17, journaled at its ends in which is a transverse take-up shaft 18 carrying spaced sprockets 19 likewise aligned with the sprockets 14, 16, as best seen in Figure 3.

Trained over the respective aligned sets of sprockets 14, 16, and 19, is a pair of endless chains 20 correspondingly spaced transversely of the machine, and spaced in transversely aligned pairs along the chains 20, are series of link-carried lugs 21 suitably recessed or apertured for reception of reduced ends or pintles of transverse chain spanning and supported rod-like flights or loaf-pushers B, as best seen in Figure 2, the upper runs of the chains 20 slidingly engaging, and moving in a rearward direction for transporting their carried flights B over, the loading plate 8 and the front portion of the feeding-plate 9 for descent of the chains 20 and flights B under the plate 9 through the slot 10 thereof, as will be clearly understood from Figure 3.

Supported preferably by, and upstanding from, the opposite frame-members 5, are pairs of brackets 22, disposed upon which for adjustment transversely of the machine are opposed sets of suitable lengthwise slotted arms 23 carrying respective wings or guides 24 extending the length of the plate 8 and partly over the plate 9 for guiding the baked loaves propelled by the pushers B therebetween, the respective arms 23 and their carried guides 24 being secured in adjusted loaf-guiding positions as by means of thumb-screws 25 threaded into the brackets 22, as best seen in Figures 1 and 2.

Upstanding from the opposite front corners of the frame A, is a pair of standards 26, intermediate of which the chains 20 and pushers B travel, and mounted in the standards 26 at a suitable elevation above the feed-plate 9, is a pair of horizontal opposed and aligned stub-shafts 27 carrying a pair of correspondingly spaced sprockets 28 disposed somewhat forwardly of the vertical plane of the sprockets 16, as shown in Figure 5.

Upstanding from the frame top-rails 3 at a suitable distance rearwardly from the standards 26, is a pair of brackets 29, which, in an inverted generally triangular shape project forwardly for supporting a motor-platform 30 disposed for convenience and economy of space suitably in elevated position over the feed-plate 9, as best seen in Figures 5 and 6.

Mounted in opposed relation on the inner face, of the respective brackets 29, is a pair of vertical angle-members 31 whose inturned legs 32 support respective bearings 33 in which is journaled a shaft 34 carrying a pair of spaced sprockets 35. Also mounted suitably on the angle-members 31, is a shaft 36 rotatively supporting a pair of idler-sprockets 37 disposed rearwardly of and below the respective sprockets 35, the sprockets 28, 35, and 37 being of such relative diametrical dimensions that the upper and lower boundaries of the rotative plane of the sprockets 28 align respectively with the upper boundary of the rotative plane of the sprockets 35 and the lower boundary of the rotative plane of the idlers 37, as best seen in Figure 5.

Suitably mounted upon, and upstanding in opposed pair relation from, the upper frame-rails 3 intermediate the front standard 26 and the brackets 29, as best shown in Figures 5 and 6, are series of spaced obliquely inwardly presented chairs or track-supports 38, each provided adjacent its base with a hub 39 in which an arm 40 is slidably mounted and adjustably secured by a set screw 41. Supported by the arms 40 on the respective sides of the machine, is a pair of preferably rod-like loaf-guides 42 extending in suitably elevated position longitudinally over the feed-plate 9 for guiding therealong the loaves to be sliced, as will presently appear.

At their upper end, the chairs 38 are suitably bifurcated or forked providing inwardly presented vertically spaced upper and lower jaws 43, 44, respectively. On each side of the machine, the upper jaws 43 have suitably fastened to their lower face a track-angle 45 having its inner leg upturned, as shown in Figure 6. Spaced from the track-angles 45 and supported on the respective lower jaws 44, are track-plates or bars 46, the track-ways so provided extending longitudinally over the feed-plate 9 approximately in alignment with and between the respective pairs of sprockets 28 and 37. The angles 45 throughout their length project inwardly beyond the bars 46, and adjacent their front ends 47, the angles 45 are suitably slotted for receiving the front sprockets 28, forwardly of which the terminal ends 47 of the angles 45 project with an upward curve, as best seen in Figure 5, for purposes presently appearing.

Adapted for traveling over the sprockets 28, 35 and 37, are chains 48, and suspended from, and disposed transversely the machine between, the chains 48, is a series of loaf-feeders or flights C each comprising chain-spanning and supported feeder-carrying cradles 49 having at their opposite ends suitably projecting arms provided with hubs 50 carrying laterally projecting pins 51 pivotally engaging link-carried lugs 52 spaced suitably in transversely aligned pairs along the chains 48, the spacing of the feeders C longitudinally of the machine along the chains 48 being approximately equal to the spacing of the pushers B along the chains 20, for purposes presently appearing.

Projecting forwardly from respective opposite ends of each cradle 49, are lugs 53 suitably apertured for reception of pins 54 having pivotal engagement with ears 55 projecting also forwardly from a backing or feeder plate 56 extending across and disposed for presently appearing swinging movement upon the rear face of the cradle 49, the latter carrying depending resilient strips or springs 57 engageable with the front face of the feeder-plate 56 for normally biasing the same flatwise upon the back of the cradle, as shown in Figures 5 and 6.

Figure 17:
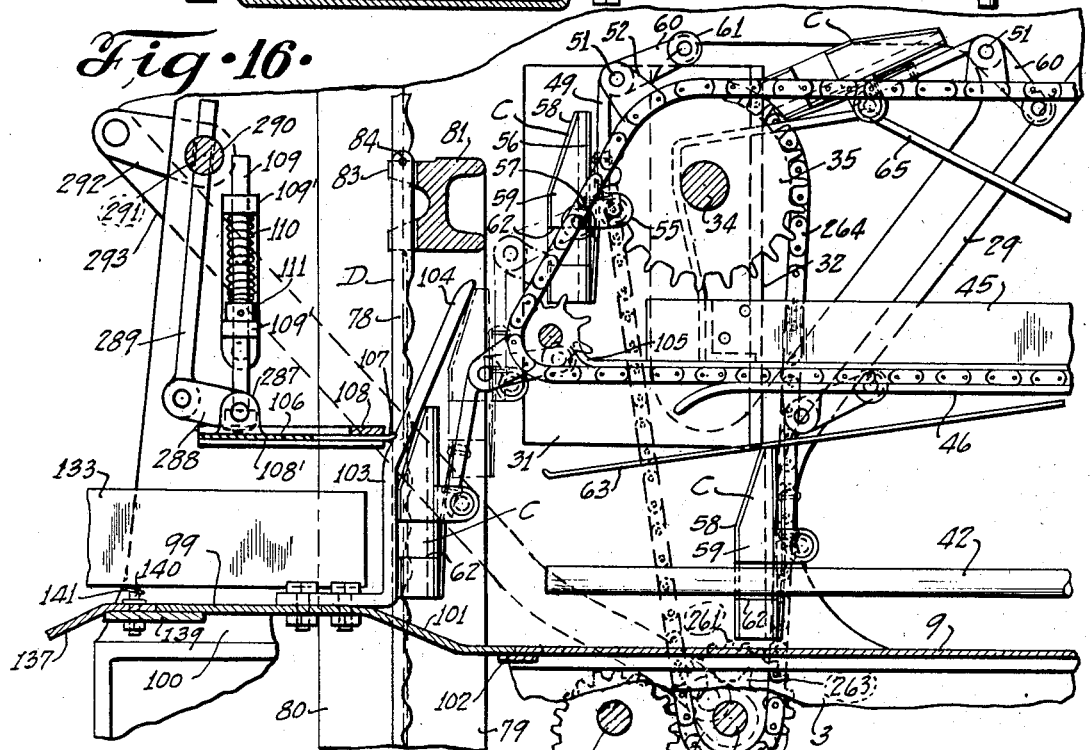
Figure 17 is a fragmentary side sectional view corresponding to Figure 16 and taken generally along the line 17—17, Figure 6, the upper portion of the mechanism being broken away.

Suitably mounted upon the rear face of each feeder-plate 56, is a rectangular loaf-feeding block 58 preferably constructed of wood, fiber, or the like, and as best seen in Figure 16, provided with a plurality of vertical kerfs forming a series of spaced rearwardly projecting tongues or teeth 59 suitably at their upper ends obliquely forwardly and upwardly chamfered, as shown in Figures 5 and 17. At their opposite side marginal rear faces, the blocks 58 are also provided with wearing strips 59', best seen in Figure 16, for purposes presently appearing.

The feeders C are disposed transversely of the machine for chain-propelled loaf-feeding movement from front to rear of the feed-plate 9 during like movement of the particular feeder-supporting chain-lugs 49 along the lower runs of the chains 48, as seen in Figure 5, and for retaining the particular feeders C in vertical position during such loaf-feeding movement thereof, the cradle hubs 50 are provided with obliquely upwardly and forwardly projecting arms 60 carrying rollers 61 for engaging the underside of the track-angles 45, as seen in Figure 5.

The cradles 49, when in such latter loaf-feeding position, are disposed with their lower margins adjacent to, but suitably for clearance purposes spaced from, the guides 42, and the feeder plates 56 and their carried blocks 58 are so dimensioned that their lower margins are disposed below the cradles 49 and adjacent to, but suitably for clearance purposes spaced from, the feed-plate 9.

The width of the feeders C is selected to span the largest size loaf the particular machine is designed to handle, and for handling smaller loaves the guide-bars 42 are suitably adjustably drawn together for properly guiding the loaves to be sliced. Hence, the feeder plates 56 and blocks 58 are provided at their respective opposite ends with marginal cut-outs or notches 62 for affording clearance to such inwardly adjusted loaf-guides 42, as best seen in Figure 6.

By means presently more particularly appearing, the movement of the feeders C is synchronized with that of the pushers B in such manner as to bring a respective feeder C downwardly upon the feed-plate 9 in front of the point of departure of a particular pusher B from the plate 9 through the slot 10, each particular feeder C being then disposed immediately behind a corresponding particular pusher B for thereby providing overlapping co-operation between the pushers B and feeders C during a portion of their travel for transferring, as may be said, the loaves to be sliced successively from the pushers B to the feeders C during the operation of the machine.

The feeders C thus engage the loaves deposited on the feed-plate 9 by the pushers B for propelling the loaves rearwardly over the plate 9 to the slicing-mechanism of the machine, presently to be described, the loaves, during such movement, being engaged by a loaf-positioning or hold-down device which includes a transversely disposed series of flexible tongues or spring fingers 63 united or connected at their forward end to a suitable bar or frame-member 64 supported by and between the track-angles 45.

At their rear end, the fingers 63 are preferably disconnected for independently yielding one with respect to the other responsively to engagement of the fingers 63 with the more or less uneven contour of the top-side of the bread-loaf, the fingers 63, however, being of such a flexible and resilient nature as to readily convexly downwardly flex or bow between the successive pairs of feeders C for engaging a loaf therebetween, as will be understood from Figure 5, and thereby firmly and squarely positioning a loaf against its particular feeder C.

As the chain-carried lugs 52 pass over the idler-sprockets 37, the lug-supported feeders C co-operate with the slicing-mechanism for feeding the loaves thereto and therethrough, as will later appear, the feeders C being thereafter elevated and shifted forwardly and upwardly by and with the chain-lugs 52 as the latter then, in turn, pass over the sprockets 35, as best seen in Figure 17.

Normally, it may be said, the feeders C are so constructed as to freely hang or depend from and between the chains 48 in approximately vertical position, as shown in Figure 5, and for tilting the feeders C during their traverse over the sprockets 35 for clearing the sprocket-shaft 34, I provide a trip-bar 65, which is mounted upon, and has a portion upstanding from, the approximate transverse center of a suitable transverse member 66 supported by and between the track-angles 45, the trip-bar 65 being bent and curved upwardly and over the shaft 34 and from thence being downwardly and forwardly inclined or curved for tilting or lifting the feeders C over the shaft 34 and then gently guiding the feeders C to vertical position as the latter are transported forwardly along the upper run of the chains 48, as best seen in Figures 5 and 17.

As the feeders C approach the front sprockets 28, the feeder-carried rollers 61 engage a pair of suitably disposed and transversely spaced upper-track-bars 67 attached at their rear-ends to the motor-support 30 and extending downwardly forwardly therefrom towards, and for attachment to, a transverse cap-piece or bridge-member 68 spanning the standards 26, from which the bars 67 continue forwardly in a downwardly bent and arcuately curved direction around the sprockets 28 for disposing their respective forward ends 69 in suitably spaced adjacence to the respective forward ends 47 of the track-angles 45, providing a throat 70 therebetween for passage of the rollers 61 therethrough whereby the feeders C are guided and caused to take a vertical position during their passage over the sprockets 28 and between the spaced ends of the stub-shaft 27 for return to, the feed plate 9 for repetition of their loaf-feeding cycle.

Formed on the rear vertical faces of the brackets 29, are opposed inturned flanges 71, and upstanding from the opposite rear corners of and preferably integral with the top-rails 3 of, the frame A, is a pair of standards 72 having opposed inturned flanges 73, spaced suitably from and approximately parallel with the bracket-flanges 71. Intermediate the flanges 71, 73, the frame-rails 3 are respectively cut-away along their top flanges as best seen in Figure 16, and formed with inwardly extending integral flanges forming downward or depending continuation of the respective flanges 71, 73, as seen in Figure 5.

Fitted horizontally between the respective pairs of confronting or opposed flanges 71, 73, are pairs of upper and lower approximately H-shaped guide-supports 74, 75, respectively mounted on and between each pair of which is a corresponding pair of spaced parallel outer guides 76 and an intermediate also parallel guide 77, each trio of guides 76, 77, being spaced inwardly from the side-flanges of the respective adjacent frame top-rail 3, as shown in Figure 16.

D designates generally the slicing mechanism of the machine which comprises transverse series of cutting or slicing elements or knives 78 having their cutting edges forwardly presented for slicing engagement with the loaves advanced therethrough by the feeders C, as will shortly appear. The knives 78 are operatively supported in oppositely reciprocable alternate pairs by means of a pair of confronting front and rear knife-carrying frames 79, 80, each preferably of substantially rectangular outline and each comprising top and bottom rails 81, 82, respectively, each of the rails 81, 82, being provided with a series of spaced lugs 83 disposed in such manner that the lugs 83 on the frames 79 project rearwardly therefrom for interfitting the lugs 83 projecting forwardly from the frame 80.

The lugs 83 are slotted for reception of the respective ends of the knives 78, and by means of suitable taper-pins 84 passed through the ends of the knives 78, as shown in Figure 16, the latter are tensionally mounted in and between the respective vertically aligned pairs of lugs 83 on the also respective frames 79, 80, whereby the knives 78 are adapted for actuation by and on opposite reciprocation of the frames 79, 80, each adjacent pair of knives 78 in opposing directions for substantially neutralizing the slice-displacing effect of the cutting operation.

Suitably for such reciprocatory purposes, the frames 79, 80, are provided with elongated shoes or slides 85 projecting laterally outwardly from the respective opposite sides of the frames for sliding co-operation with the registering ways provided by and between the respective pairs of guides 76, 77, the shoes 85 and frames 79, 80, being suitably apertured for reception of the reduced ends of bolts 86, whose inner threaded ends are engaged by nuts 87 for retaining the bolts in the frames, and whose larger suitably headed outer ends project outwardly of the shoes 85 for providing connecting-rod journals 88, as clearly seen in Figure 16.

The motor-support 30 is extended from the brackets 29 rearwardly over the knife-frames 79, 80, for transversely also connecting the upwardly presented ends of the standards 72, and upstanding from the support 30 is a pair of spaced bearings 89 in which is journaled a shaft 89' disposed preferably in the vertical plane of the knives 78. Mounted on each of the opposite ends of the shaft 89', which suitably projects outwardly for such purpose from the respective sides of the support 30, is a combination flywheel-and-crank 90 which includes a pair of registering double or 180-degree throw crank-pins 91, the intermediate arms of the crank-pins 91 comprising preferably relatively thin plates or discs 92, whereby the centers of the crank-pins 91, of the respective cranks may be disposed in closely adjacent axial relation, as best seen in Figure 1.

Pivotally depending from the respective pairs of the crank-carried pins 91 on the opposite sides of the machine, are pairs of links 93, 94, the lower end of each registering pair of links being pivotally mounted on the frame-carried journals 88 for suspending and reciprocating the frames 79, 80, in and between the guides 76, 77, the links being suitably downwardly inwardly curved over the edges of the support 30, as will be understood, for effecting proper connection with the frames 79, 80, and being preferably enclosed by suitable housings 94', as shown.

It will be seen that, on rotary actuation of the shaft 89, the cranks 90, having a 180-degree difference in throw of their crank-pins 91, actuate the frames 79, 80, and their carried knives 78, simultaneously in opposing directions for slicing the loaves fed the knives 78, the distance between each pair of knives 78 being selected, as will be understood, suitably to the thickness of the loaf-slices desired.

Preferably the frames 79, 80, are actuated independently of the loaf-propelling mechanism of the machine, in order that the cutting speed of the knives 78 may be adjusted suitably to the texture of the baked-loaf. For such purpose, an electric motor or like prime-mover 95 has suitable driving connection with the shaft 89', as by motor pinion 96, chain 97, and shaft-mounted sprocket 98, the motor 95 being suitably mounted on the motor-support 30, as best seen in Figure 1.

Preferably, the drive-connection between the motor 95 and shaft 89' is enclosed and guarded in a suitable casing or housing 98', as best seen in Figure 3.

The feed plate 9 proper terminates in front of and suitably to clear the front knife frame 79, as best seen in Figure 17, and the baked-loaves are supported for movement through and beyond the knives 78 by a grid-plate 99 supported, as at 100, from and between the corners of the frame A at a suitable presently appearing elevation above the feed-plate 9. At its forward margin the grid-plate 99 has a transverse series of spaced fingers 101, which project forwardly and obliquely downwardly and between the respective pairs of adjacent knives 78, and have their respective forward ends supported by a member 102 in flushwise abutting relation to rear edge of the feed-plate 9, as shown in Figure 17.

The grid-plate 99 extends rearwardly intermediate the frames 79, 80, as shown in Figure 16, and mounted on the plate 99, outwardly of the respective terminal knives 78 on each side of the machine, are upstanding feeder-guides 103 having their respective forward faces disposed rearwardly of the plane of the cutting edges of the knives 78. The upper portions of the guides 103, however, are forwardly and upwardly inclined or bent for disposing their respective ends 104 substantially forwardly of the plane of the knives, the shape of the guides 103 being generally complementary to the contour of the projecting teeth 59 of the feeders C, as clearly seen in Figure 17.

I will now describe in part the action of the feeders C as the chain-lugs 52 pass over the idler-sprockets 37, reference being particularly had to Figures 16 and 17.

As will be seen, the kerfs in the feeder blocks 58 correspond respectively to the knives 78 in the frames 79, 80, the respective teeth 59 of the feeders C being adapted for entry between the also respective pairs of knives 78 of the slicing mechanism D for feeding the sliced-loaf rearwardly through and beyond the same.

For such purpose, the track-angles 45 are formed at their respective rear ends 105 in such manner as to continue engagement with the rollers 61 for rearwardly swinging the cradles 49 on the chain-lugs 52 as the latter begin their travel upwardly and around the rear face of the sprockets 37, whereby the cradles 49 are oscillated to an oblique rearward position for shifting the blocks 58 rearwardly, in turn, beyond the plane of the cradle pivots 51 until the rear side marginal wearing strips 59' of a particular block 58 engage the body-portions of the feeder-guides 103.

The teeth 59 of the block are then disposed substantially between and approximately through the respective pairs of knives 78 for thus pushing or feeding the knife-formed slices of the baked loaf substantially through the bank of knives 78 and upwardly onto the grid-plate 99, the block 58 meanwhile also swinging on its pivots 54 against the tension of the cradle springs 57 for taking a vertical position on the, at such time, obliquely disposed cradle 49, as best seen in Figure 17.

As the chain-lugs 52 advance upwardly and forwardly around the sprockets 37, the feeders C are correspondingly lifted above the plane of the feed-plate 9, which movement is compensated for by the upward inclination of the grids or fingers 101, whereby displacement of the sliced portions of the baked-loaf due to such movement of the feeders C is substantially prevented.

However, when the slices have been fed through the knives 78 as described, the feeders C are rapidly upwardly and forwardly withdrawn from the knives 78 by reason of the like inclination of the chain 48 between the sprockets 37 and 35, the blocks 58 being guided for such oblique upward movement by their now succeeding engagement the forwardly oblique end-portions 104 of the guides 103, as also clearly seen in Figure 17.

The feeders C, however, as will presently more fully appear, have a loaf feeding action concerning which it may here be said that the feeders C during the loaf-slicing operation are suitably actuated for progressively varying the rate of feed of the particular loaf through the knives 78 suitably to the relative ability of the crusted-sides and soft sponge-like center of the loaf to withstand the cutting action.

Also, as a precaution against displacement of the loaf-slices both during and while emerging from their engagement by and between the knives 78, a hold-down plate 106 is resiliently and shiftably supported over the grid-plate 99, as best seen in Figure 16. As shown, the plate 106 has a plurality of forwardly presented suitably spaced yielding fingers 107 extending respectively to and between the pairs of knives 78 for engaging the loaf while it is being sliced, the plate 106 having a shifting movement, in co-operation with that of the feeders C, as will presently more particularly appear, for meeting the loaf advancing toward the knives 78 and thence moving rearwardly with the loaf while in engagement with the knife-formed slices.

For such purpose, the plate 106 is slidably mounted with its opposite side-margins engaging suitable grooves 108' provided in the corresponding side members of a U-shaped frame 108 having its transverse portion or bight disposed across the front margin of the plate 106. At each rear corner of the frame 108, is an upstanding plunger 109 working in and through suitably spaced lugs 109' projecting inwardly from the adjacent standard 72, the frame 108 being yieldingly supported for biasing its carried shiftable plate 106 toward the grid-plate 99 for engaging the sliced loaf therebetween, preferably by means of plunger-carried springs 110 engaged between the upper lugs 109' and collars 111 on the respective plungers 109, the collars 111 impinging the lower lugs 109' for limiting the downward movement of the frame 108 and its supported plate 106, as best seen in Figure 17.

Upstanding from the plate 106, is a pair of registering spaced lugs 287 having respective pivoted connection with links 288, in turn, pivotally connected to respective upright crank-arms 289, swingingly actuable by an oscillatory shaft 290 journaled suitably in and between the standards 72. The arms 289 are also slidingly mounted in and through suitable diametrical apertures 291 provided in the shaft 290 for accommodating the upward shifting movement of the plate 106 while communicating the oscillatory movement of the shaft 290 to the arms 289 for correspondingly reciprocating the plate 106.

As best seen in Figures 1 and 17, one end of the shaft 290 projects beyond the adjacent standard 72 and carries a crank 292 having pivoted connection with a link 293 extending downwardly and forwardly to and for pivotal connection of its other end with a crank 294 rotarily mounted on the frame-projecting end of a shaft 262 journaled in and through the frame rails 3 forwardly of the slicing mechanism D, the shaft 262 having an operative function presently more fully set forth.

Rearwardly projecting from the opposite rear corners of the frame A, are brackets 112 having bearing-hubs 113 supporting for rotation a main transverse drive-shaft 114. Extending rearwardly from the frame A, is a conveyer-frame comprising a pair of laterally spaced more or less horizontally disposed frame-members 115, preferably of angle-section, having their respective front ends provided with hubs 116 pivotally mounted on the shaft 114 intermediate the brackets 112, as best seen in Figure 4, whereby the frame-members 115 and their carried parts may be obliquely disposed with respect to the machine proper, as and if conditions may so require.

Suitably supported by the frame-members 115, is a loaf-delivery plate or table 117 having its front end spaced from and disposed in a plane below that of the grid-plate 99, and fixed on the shaft 114 intermediate the frame members 115, is an elongated belt-pulley 118 whose upper arc is tangent to the upper face of the plate 117, as best seen in Figure 15.

At an intermediate rearward point, the plate 117 is provided with a transverse slot 119, and suitably journaled in the frame-members 115 and disposed in the vertical plane of the slot 119, is a transverse shaft 120 carrying a belt-pulley 121 similar to the pulley 118 and in like manner disposed tangent to the plate 117, the journals of the shaft 120 being mounted in suitable take-up bearings 122. Trained or reeved over the pulleys 118, 121, is an endless belt 123 of canvas, rubber, or the like, whose upper run slidingly moves or travels rearwardly on the delivery-plate 117, as best seen in Figure 1.

Disposed below the plane of and suitably spaced from the rear end of the plate 117, is a transverse shaft 124 suitably journaled in the frame-members 115, and mounted on the shaft 124, is a pair of spaced sprockets 125 rimwise working in respective marginal notches or slots provided in the end of the plate 117.

Mounted on the shaft 114 at the respective opposite ends of the belt-pulley 118, is a pair of front sprockets 126 aligned with the corresponding pair of rear sprockets 125.

Also, suitably mounted dependingly from the frame-members 115 near the front end thereof, as seen in Figure 3, are suitable take-up bearings 127, in which is journalled a transverse shaft 128 carrying a pair of spaced sprockets 129 aligned also with the pair of sprockets 125.

Trained over the respective aligned sets of sprockets 125, 126, and 129, is a pair of endless chains 130 similar to the chains 20 and likewise having spaced pairs of lugs 21' supporting transverse rod-like flights or loaf-pushers B', as seen in Figure 4, the upper runs of the chains 130 moving in a rearward direction for transporting their carried flights B' over the belt 123 and the delivery-plate 117, the flights B' during such movement having approximately the same speed as that of the belt 123. The spacing of the flights B' on the chains 130 is, however, greater than that of the spacing of the flights B on the chains 20, and the chains 130 consequently have a greater linear speed than that of the chains 20 for providing equal loaf propelling capacity, as will presently more particularly appear.

Mounted on the frame-members 115, are pairs of brackets 22' carrying arms 23' for supporting loaf-guides 24' extending substantially the length of the delivery-plate 117, thumbscrews 25' being provided in the brackets 22' for adjustably securing the guides 24' in position in a manner and for a purpose similar to the guides 24 previously described.

Near the front-end of the guides 24', however, is a pair of lugs 131 carrying pintles 132 hingedly supporting forward guide-extensions or wings 133 extending approximately adjacent to the knives 78, as best seen in Figure 15, and mounted on the ends of the guides 24', and passing through the wings 133, are studs 134 carrying springs 135 engaged between the wings 133 and stud-carried thumbscrews 136 for yieldingly inwardly biasing the wings 133 upon the guides 24', as best seen in Figure 1. It will be here mentioned that the loaf passing through the knives 78 is slightly lengthwise expanded, more or less, due to the thickness of the several knives, and the wings 133 function to tensionally engage the respective opposite crusted end slices of the loaf for restoring the sliced loaf substantially to its pre-sliced shape and dimensions.

The sliced loaves of bread propelled or pushed over the grid-plate 99 are discharged therefrom onto the belt 123 over an inclined apron or plate-extension 137 having an angular front lip or portion 138 which fits flushwise into a suitable cut-out provided in, and which is supported on a suitable flange 139 mounted flushwise on the underside of, the grid-plate 99, as best seen in Figure 15. The lip 138 projects suitably beyond the sides of the apron 137, and a pair of bolts 140 upstanding from the flange 139 pass through the respective opposite ends of the lip 138, suitable bolt-mounted springs 141 being engaged between the apron-lip 138 and the heads of the bolts 140 for yieldingly retaining the lip 138 upon the flange 139 and the apron 137 upon the belt 123, as seen in Figures 15 and 16, the apron 137, as also illustrated in Figure 15, swingably yielding upwardly against the tension of the springs 141 for passage of the pushers B' thereunder as the pushers B' advance upwardly around the sprockets 126 for traversing the delivery plate 117.

142 designates certain conveniently or otherwise suitably selected parts of the wrapping-machine proper (not shown). In the present instance, the parts 142 comprise a pair of spaced front and rear horizontal rods or the like disposed in a plane below that of and transverse to the delivery plate 117, mounted on which rods, preferably by means of suitable split hubs 143, is a pair of vertically upstanding side frame members 144 disposed in relatively widely spaced relation respectively on the opposite sides of the longitudinal axis of the machine, the side-frames 144 having in side elevation an angular shape extending rearwardly upwardly and then forwardly for terminating in spaced relation to, and at the approximate level of, the delivery table frame-members 115, as best seen in Figure 9.

Mounted on the respective upper ends of the side-frames 144, are inwardly presented angular brackets 145 having forwardly projecting legs disposed in spaced relation to the rear ends of the delivery-plate frame-members 115, to which latter the brackets 145 are suitably attached as by lugs 146 engaging the members 115 forwardly of the rear ends thereof, as best seen in Figure 1.

Suitably rotarily mounted in the respective rear ends of the frame-members 115 and having its ends disposed in the spaces between the members 115 and the brackets 145, as seen in Figure 11, is a transverse shaft 147 forming part of a rollover or loaf-turning mechanism E, which also comprises a loaf-receptive platen 148 having at its respective opposite ends depending flanges terminating in rearwardly presented hubs 149 arranged on the shaft 147 for oscillation of the platen 148 in upward and rearward loaf-turning direction, as will presently appear.

Upstanding from the rear margin of the platen 148, is a back-wall 150, and edgewise slidingly engageable with the back-wall 150 for normally residing flatwise upon the platen 148, is a push-plate 151 having a pair of plungers 152 suitably working through the platen 148 and carrying springs 153 engaged between the platen 148 and plunger-carried stops 154 for normally biasing the push-plate upon the platen, as seen in Figure 3.

Disposed at the respective opposite corners of the free margin of the platen 148, are hubs 155 supporting for oscillation a shaft 156 extending transversely beneath the platen 148 and carrying a pair of arcuate wiper-arms 157 working through slots 158 provided suitably in the platen 148 for operative plate lifting engagement of the wipers 157 with the underside of the push-plate 151. At its opposite ends, the shaft 156 projects outwardly beyond the platen 148 and carries respective hooks or dogs 159 for engagement, on upward rearward oscillation of the platen 148, with stops 160 supported at a suitable elevated position in the path of the dogs 159 by means of standards 161 upstanding from the adjacent frame-members 115, as best seen in Figures 9 and 11.

Disposed on the projecting end of the shaft 147 between the frame-member 115 and the bracket 145 on the wrapping-machine side of the mechanism, as best seen in Figure 1, is a crank-arm 162, pivotally connected at one end to which is an obliquely upwardly and rearwardly extending link 163 having its other end pivotally connected to the upper-end of an oscillating lever 164 intermediately fulcrumed, as at 165, on a suitable pivot-carrying member supported from the adjacent bracket 145, as best also seen in Figure 1.

At its lower end, the lever 164 carries a roller 166 having operative engagement with an edge-cam 167 suitably keyed on a continuously rotatory shaft 168 journaled in, and extending between, the side-frames 144, as best seen in Figure 10. As will be understood from Figure 9, the cam 167 is of a generally oblate shape providing a retracted rest portion $a$ and an advanced rest portion $b$ with suitably formed rising and falling portions therebetween.

When the roller 166 is engaged with the retracted cam-portion $a$, the lever 164 is swung for forwardly oscillating the crank 162 until the platen 148 is disposed, with the push-plate 151 in normal, platen-engaging position thereupon, in forwardly presented position adjacent the end of the delivery-plate 117 for reception therefrom of a loaf propelled by a particular pusher B', as best seen in Figure 3, the lever 164 being biased on the cam 167 by means of a suitable tensional member or spring 167' engaged between the lever 164 and the adjacent bracket 145.

As the roller 166 is then advanced upon the cam-portion $b$, the lever 164 is reversely swung for rearwardly oscillating the crank 162 until the platen 148 is disposed upended rearwardly with the carried loaf in rolled-over sidewise position on the back-walls 150, the dogs 159 impinging the stops 160 for actuating the wipers 157 for shifting the push-plate 151 rearwardly in spaced relation to the platen 148 for discharge of the carried and turned loaf from the roll-over E, as best seen in Figure 9.

F designates generally an intermittently operable loaf-rotating wheel having a series of circumferentially spaced loaf-receptive pockets 169 and which comprises a sleeve 170 mounted for rotation on and independently of, the shaft 168, the sleeve 170 carrying at its respective opposite ends a pair of sleeve-spaced radial discs or drum-heads 171, supported by and between which is a polygonal preferably four-sided or box-like drum 172, whose sides provide the bottom-walls of the pockets 169. The pockets 169 include fixed side walls 173 projecting outwardly from the respective corners of the drum 172 and, in opposed relation to the fixed walls 173, shiftable drum-outstanding side walls 174 having angular flanges 175 disposed upon the fixed wall 173 of the next adjacent pocket, as best seen in Figures 9 and 10.

The flanges 175 are provided with transverse slots 176 working over thumb-screws 177 threaded into the fixed wall 173 of the next adjacent pocket 169 for adjusting the width of the respective pockets suitably to the width of the loaves. The shiftable walls 174 are also each provided with a pair of longitudinal slots 178, in which work thumb-screws 179 threaded into flanges 180 of pocket-end walls 181 for adjustably shifting the latter lengthwise of the respective pockets suitably to the length of the loaves, as best seen in Figure 10.

During the normal or rest period of the wheel F, a particular pocket 169 is disposed in operative registration with the turn-over E for reception of a loaf therefrom, the fixed pocket-walls 173 being provided with projecting lips 182 for disposition flushwise with the end of the back-wall 150 of the uptilted roll-over E for receiving the loaf slidingly therefrom for depositing the loaf in the pocket, as best seen in Figure 9.

Subsequently, by means presently to appear, the inverting wheel F is caused to rotate one-quarter revolution for inverting its carried sliced loaf bottom-side up, the wheel F then coming to rest and so remaining for a predetermined interval for the deposit of a tray G suitably upon the loaf by a tray-applying apparatus H, the turn-over E meanwhile reverting or returning to its normal position adjacent the delivery-table 117 for reception of the next successive loaf therefrom.

It may here be pointed out that, for assisting the proper disposition of the sliced loaf into the wheel F, the latter is stopped or has its normal position with the radial axis of the particular pocket 169 presented to the turn-over E disposed forwardly with an upward inclination, and consequently, in a four-pocket wheel of the type shown, the radial axis of the pocket 169 is presented upwardly with its inverted loaf in like degree disposed upwardly with a rearward inclination, as best seen in Figure 9.

For a clear understanding of, and before proceeding with, the description of the tray-applying apparatus, a brief explanation will be given of a preferred form of loaf-containing tray G, best seen in Figure 9a, although it will be understood that other or similar trays or like containers or holders may be employed as may best serve the intended purpose.

The tray or holder G is shown in Figure 9a in expanded condition and comprises a bottom wall $c$ having foldably connected upwardly presented side walls $d$ and end walls $e$. In the formation of the tray G, the end walls $e$ are scored along diagonal lines $f$ extending from the opposite corner junctions of the bottom wall $c$ with the end walls $e$ and meeting, as at $g$, the free edges of the respective end walls $e$. Its end walls $e$ being so scored, the tray G is normally collapsed, as may be said, upon itself with the end-walls $e$ infolded upon the bottom wall $c$ and the side walls $d$, in turn, folded upon the end walls, the tray-structure G then being in flatwise flattened condition and readily stacked for storage or feeding purposes, as will presently appear.

The tray G is especially adapted and in the present instance is employed for holding the sliced baked loaf in a shape conformable to the baked loaf prior to the slicing operation, whereby the sliced loaf may readily be processed through a suitable wrapping machine, the tray walls $d$ for such purpose being outwardly folded or expanded from the bottom wall $c$, thereby causing the end walls $e$ to also unfold and expand as in Figure 18 sufficiently for placing the tray G over and upon the inverted bottom side of the sliced-loaf, the end-walls $e$ automatically tending to take their normal flexed condition for gripping the loaf endwise, with the side-walls $d$ also flexed for likewise grippingly engaging the outer vertical crust-covered side edges of the slices.

Proceeding now with the description of the machine, H designates the tray-applying apparatus, the general axis of which, although for convenience in description referred to as vertically disposed, is, in fact, rearwardly inclined for residing in radial alignment with the particular upwardly presented pocket 169 of the wheel F, as best seen in Figure 9.

The apparatus H includes a pair of spaced standards 183, 183' suitably upstanding from the side-frames 144 and connected at their upper end by a pair of spaced front and rear tie-bars 184, best seen in Figure 1.

Centrally disposed between the tie-bars 184, is a pair of confrontingly spaced channel-shaped chutes 185 having threaded into their respective opposite side-flanges opposed thumb-screws 186 working in suitable transverse slots provided in flange-engaging lugs 187 upstanding from lateral arms 188 disposed in opposite pairs on the tie-bars 184, the arms 188 having longitudinal slots, best seen in Figure 1, for working over thumb-screws 189 threaded into the respective bars 184, whereby, most conveniently, various sizes of the chutes 185 may be supported between the bars 184 as may best serve the purpose.

The chutes 185 are adapted to receive and contain a series or stack, as may be said, of flattened and collapsed trays G, the latter being inserted in and between the chutes 185 with their open sides downwardly presented, as sectionally shown in Figure 9. The vertical axes of the chutes 185 are also in alignment with the particular upwardly presented pocket 169 of the loaf-inverting wheel F, the chutes 185 at their lower end being suitably spaced, for reasons soon appearing, from the wheel F and being respectively provided with a pair of inwardly sprung opposing flexible strips or fingers 190 having yielding engagement with the trays G for removal of the trays, one at a time, from the chutes 185 for application of the removed tray to the inverted loaf positioned in the wheel F therebelow.

Vertically reciprocable in and through suitably aligned upper and lower guides 191, 192 projecting inwardly in pair relation from the respective standards 183, 183' are plungers 193 carrying at their respective lower end rollers 194 having operative engagement with corresponding edge-cams 195 keyed to the shaft 168 for rotation therewith, as best seen in Figure 10. The cams 195 have a generally kidney-shaped contour providing relatively gentle plunger-dropping portions $h$ breaking into relatively abrupt plunger-lifting portions $k$ merging into relatively protracted concentric portions or dwells $m$, the latter being operative for retaining the plungers 193 in their normally elevated position, as shown in Figure 9.

Mounted on each of the plungers 193 intermediate the guides 191, 192, is a collar 196, between which and the upper guide 191 is disposed a plunger-mounted tensional member or spring 197 for normally biasing the plunger upon the cam 195. Mounted on each collar 196 and axially projecting to the front and rear thereof, are opposed lateral arms 198 each having mounted on its projected end a bearing or fixture 199 registering with the like bearings 199 on the other plunger 193. Journaled in and through the respective pairs of registering bearings 199 and extending transversely across the machine on the respective front and rear sides of the chutes 185, is a pair of oscillatory shafts 200, best seen in Figure 10.

Mounted on each of the shafts 200, is a pair of spaced hollow or tubular suction arms 201. Preferably the arms 201 have hubs 202 adjustably secured to the shafts 200 by hub-carried thumb screws 203 (Figure 12) for varying both the longitudinal spacing and the angular relationship of the arms 201 on the shaft 200 as may best serve their intended purpose. Normally, however, the arms 201 depend from the shafts 200 in front and rear opposing pairs for extending obliquely inwardly under the chutes 185, the arms 201 at their lower end being further inwardly curved or bent and terminating in hubs 204 disposed adjacent to and beneath the stacked trays G in the chutes 185, as best seen in Figure 9.

Mounted for oscillation in each of the hubs 204, is a swivel-elbow 205 comprising an angle body member having an annular flange 206 engaging one side face of the hub 204, the flange 206 having a projecting key or plug 207 rotarily fitted into the hub 204 for oscillation therein on an axis parallel to the axis of oscillation of the arm 201. The elbow 205 is suitably retained in the hub 204 by a cap 208 threaded into the end of the plug 207 and which includes a lateral annular flange engaging the face of the hub opposite to the flange 206. Extending through the elbow 205 and plug 207, is a passage 209 having in the plug-portion of its walls a plurality of apertures or ports 210 communicating with annular chamber 211 provided in the hub-body 204, the chamber 211 forming a swell or continuation of the passageway or duct 212 of the arm 201, as best seen in Figure 13.

The elbow 205 at its turned end is provided with an aperture 213 into which is fitted the suitably flanged neck 214 of a suction-cup 215 of rubber or like suitable material, the cup 215 flaring outwardly from the neck 214 and terminating in an annular soft and flexible lip or rim and having a mouth or central aperture 216 flaring inwardly from the lip of the cup through the neck 214 for communication with the elbow-passage 209, the axis of the cup 215 being right-angularly disposed with respect to the axis of rotation of the elbow 205.

Normally, that is to say, when the arms 201 are disposed in subjacent relation to the trays G in the chutes 185, the elbow-carried cups 215 are vertically disposed for respectively mouthwise contacting the particular infolded side-walls $d$ of the lowermost tray G in the chutes 185, as best seen in Figure 9. For automatically so disposing the cups 215 on the arms 201, a suitable detent or arm 217 depends from the elbow-flange 206 for impinging the projecting adjacent end of a stop or pin 218 mounted in and through a lug 219 depending from the hub 204, the hub-opposite projecting end of the pin 218 having attached thereto one end of a torsional spring 220 engaged at its other end peripherally with the flange of the cap 208 for biasing the arm 217 on the stop 218, as best seen in Figure 14.

The arm-passageways or ducts 212 extend respectively around the arm-hub 202 and terminate in nipples 221 engaged respectively by flexible conduits or pipe-sections 222, which extend loop-wise upwardly and then downwardly for connection at their respective lower ends with suitable front and rear manifolds or pipes 223 disposed transversely of the machine, as best seen in Figure 10.

At one side of the machine, the manifolds 223 are connected by short pipe-sections to a four-way fitting or cross 224 (Figure 9), the lower vertical outlet of which is engaged by a suction-pipe 225 having communication with a suitable source of negative pressure, as a suction-machine or exhauster (not shown) whereby, as will be understood, a corresponding negative pressure or suction is applied at the mouth of the cups 215. The other vertical outlet of the fitting 224 is suitably faced and provided with a flap-valve 226 swingably supported for movement by and on one end of a lever 227 intermediately fulcrummed, as at 228, on the adjacent standard 183' (Figure 10). At its other end, the lever 227 is engageable by an arm 229 mounted on the adjacent plunger 193 for working in a slot 230 provided suitably in the standard 183' (Figure 9), whereby, on descent of the plunger 193, the arm 229 will impinge the lever 227 for opening the valve 226.

The shafts 200 are provided on their respective opposite ends with upstanding cranks 231 carrying rollers 232 co-operating with channels 233 provided in guide-blocks 234 mounted on the respectively adjacent standards 183 or 183', as the case may be (Figure 10), the standards 183, 183', having slots 235 in which work thumb-screws 236 (Figure 9) threadedly engaging the respective blocks 234 for securing the same in adjusted position on the standards 183, 183'.

The channels 233 comprise relatively short inwardly downwardly oblique upper portions $p$ merging into vertical portions $r$, the rollers 232 normally residing in the portions $p$ for disposing the arms 201, as described, inwardly under the chutes 185, in which position of the arms 201, the suction normally applied to the cups 215 is effective for firmly securing the same to their contacted walls $b$ of the lowermost tray G in the chutes 185. On descent of the plungers 193 and their carried arms 201, the particular tray G is withdrawn from the chutes 185, the rollers 232 passing into the vertical channel portions $r$ for widely swingably spacing the arms 201 for unfolding the tray G and suspending the same between the arms. At the same time, the elbows 205 rotate correspondingly in the arm hubs 204, and the now widely opened tray G is neatly deposited on and over the subjacent upwardly presented bottom portion of the sliced loaf residing in the particular pocket 169 of the wheel F, as best seen in Figure 12, suitable notches 182', as seen in Figure 10, being provided in the pocket wall-lips 182 for reception of the cups 215 during such tray-applying operation.

At such time, and as the plungers 193 approach the end of their downward stroke, the plunger carried arm 229 impinges the valve-lever 227 for opening the valve 226, thus breaking the vacuum in the cups 215, whereupon the cup-released tray partially collapses in gripping engagement upon the sliced loaf, the elbows 205, under bias of the springs 220 reverting to normal position on the arms 201. The arms 201 then, on ascent of the plungers 193, re-take their normal position under the chutes 185, the valve 226 meanwhile being released by the plunger-arm 229 and automatically closing upon the fitting 224 for re-establishing the suction in the cups 215.

On ensuing quarter-revolution of the wheel F, the loaf and its applied tray G is carried around to the rear-side of the wheel, in which movement the tray-carrying loaf is retained in the particular pocket 169 under engagement with an arcuate rear guide wall 239 adjustably supported from the side frames 144, as best seen in Figure 9, the upper margin of the wall 239 having likewise suitable notches 239' for reception of the arms 201 during the tray-applying operation thereof.

And on the next succeeding quarter-revolution of the wheel H, the trayed sliced loaf is gravitationally discharged onto a laterally inclined conveyer-bed 240 of the conveyer K disposed transversely of the machine and beneath the wheel F, as seen in Figure 9, the conveyer K extending to one side of the machine for suitable connection to and co-operation with the wrapping-apparatus (not shown), of which the conveyer K forms a part, as best seen in Figure 1. It may be added that the conveyer K includes any suitable form of chain 241 disposed beneath the bed 240 and carrying spaced arms 242 working in a slot 240' provided longitudinally in the bed 240, the arms 242 terminating in pushers 243 moving along the bed 240 and a suitable side wall 244 being disposed along the lower side of the bed 240 for guiding the chain propelled loaves therealong, also as best seen in Figure 9.

It will be evident that the operations of the slicing and traying machine must be synchronized and co-ordinated with the operation of the conveyer K for successively depositing the sliced and trayed loaves thereon suitably for the most efficient functioning of its associated wrapping machine. And it is further apparent that, for the most efficient performance of the slicing and traying operations, the several mechanisms concerned must be synchronized between themselves in controlled relation with the wrapping machine.

For the accomplishment of such objects, the slicing-and-traying machine is preferably, in the first instance, actuated by and with the wrapping-machine through the medium of a suitably selected operative part thereof, as the shaft 245 fragmentally shown in Figure 1, which has suitable driving connection, as by a chain-and-sprocket arrangement 246, with the main shaft 114 of the slicing-and-traying machine. And in the second instance, the shaft 114 has direct and indirect driving connection, by the several means soon to appear, with the several co-operating instrumentalities of the slicing-and-traying machine, with the exception of the slicing mechanism D which is, by the motor 95, operated independently of the other moving parts of the machine.

As has been previously described, the shaft 114 has direct operative connection with the belt-conveyer 123 and pushers B', which are driven at a linear-speed greater than that of the pushers B and feeders C. This is due to the fact that a hiatus must necessarily exist in the steady progress of the loaves through the slicing mechanism D due to the abutting relationship of the loaves on the grid-plate 99. Thus, in a given series of baked loaves of presumably like characteristics, unavoidable differences in the widths of the loaves will nevertheless occur, and since the discharge of a sliced loaf from the grid-plate 99 to the belt 123 will be influenced by the cumulative dimensions of the loaves residing in the abutting series on the grid-plate 99, the particular moment of such loaf-passage from the grid-plate to the belt is within practicable limits indeterminate, notwithstanding that the loaves are fed through the slicing mechanism at predetermined intervals by the feeders C.

Hence, while the spacings of the pushers B and feeders C are determined principally by the intended maximum dimensions of the loaves to be sliced in the machine, the pushers B' are spaced at a greater distance apart, in order that the sliced loaf discharged from the grid-plate 99 may in any event suitably lodge on the belt 123 between a pair of the pushers B', the linear speed of the pushers B' being correspondingly increased over that of the feeders C and pushers B in order that the hourly-loaf capacity of the pushers B and B' may be equalized.

However, while the machine is thus adapted for automatically compensating for minor variations in the dimensions of a given series of bread-loaves, it is requisite that means be provided for compensating for the determinable differences in loaf-dimensions of one series of bread-loaves as compared with another, which is accomplished in the following manner,—

On the end of the shaft 114 opposite to the drive connection 246, is mounted a sprocket 247 having connection, as by a forwardly extending chain 248, with an indexing device L, which includes a sprocket 249 mounted on the projecting end of a transverse shaft 250 journaled through the frame-rails 3 forwardly of the slicing mechanism D.

The sprocket 249 is provided with a faced hub having an annular series of circumferentially spaced indexing sockets 251, and mounted on the extreme end of the shaft 250 and removably keyed thereto by a feather 252, is a collar 253 carrying an indexing pin 254 engageable with respective sockets 251 for adjusting the angular relationship of the sprocket 249 with respect to the shaft 250, the collar 253 being releasably secured in hub-abutting position on the shaft 250 by means of a hand-wheel or nut 255 having threaded engagement with the reduced end 256 of the shaft 250, as best seen in Figures 5 and 7.

Mounted on the shaft 250 intermediate the frame-rails 3, is a sprocket 257 having driving connection by means of a forwardly extending chain 258 with a sprocket 259 mounted, in turn, on the shaft 15 for effecting corresponding actuation of the pushers B. And mounted on the projecting end of the shaft 250 opposite the indexing device L, is an elliptical gear 260 meshing with a complementary elliptical gear 261 rotarily mounted on the before mentioned stub-shaft 262 projecting from the adjacent frame-rail 3, as best shown in Figure 6, the gear 261 having hub-connection both with and disposed between the crank 294 and a sprocket 263, the latter, in turn, having driving connection through a vertically extending chain 264 with a sprocket 265 mounted on the suitably bracket-projected end of the feeder-drive shaft 34, whereby the pushers B and feeders C are synchronously driven in unison by and with the shaft 250, as will be understood from Figures 5, 6, and 17.

Inasmuch as the shaft 250 is, in turn, actuated in unison with the shaft 114, and the latter drives the pushers B', it will be seen that synchronization of the pushers B' and feeders C may with ease and facility be effected by suitably setting the indexing device L for varying the angular relationship of the shaft 250 with its driving-shaft 114, whereby the feeders C, and also the pushers B, may be set forwardly or rearwardly in the machine with respect to the pushers B' for, in like manner, compensating for material increase or decrease in the cumulative length of the loaves on the grid-plate 99.

Mounted on the shaft 114 is a gear 266 meshing with a gear 267 mounted on a shaft 268 journaled suitably in and between the brackets 112. On the side of the machine adjacent the wrapping machine (Figure 1), the shaft 268 carries a sprocket 269 (Figure 4) having driving connection by means of a rearwardly extending chain 270 with a sprocket 271 mounted on the wheel-shaft 168 for effecting driving actuation thereof, as best seen in Figure 10.

Mounted also on the shaft 268 on the side of the machine opposite the sprocket 269, is a discontinuous or interrupted gear 272 having a 180-degree, more or less, toothed portion $t$ and a corresponding circumferentially smooth or toothless portion $v$. Co-operating with the gear 272, is a pinion 273 having a tooth-interrupted portion $w$ for pinion-locking engagement with the toothless portion $v$ of the gear 272, as best seen in Figure 8.

The pinion 273 is mounted on a shaft 274 journaled in and between the adjacent bracket 112 and a hanger 275 depending suitably from the also adjacent frame-member 115, the shaft 274 carrying a sprocket 276 (Figure 4) having driving connection by means of a rearwardly extending chain 277 (Figure 1) with a sprocket 278 mounted on the adjacent wheel-head 171, also best shown in Figure 10.

It will be seen that during one-half revolution of the shaft 268, and during the time the toothless portion $v$ of the gear 272 is in sliding contact with the pinion-portion $w$, the latter is locked against rotation (Figure 8), thereby restraining the wheel F against rotation on the shaft 268, and during the next half-revolution of the shaft 268, when the toothed portion $t$ of the gear 272 is in engagement with the teeth of the pinion 273, the wheel F will be correspondingly rotated through an angle, in the present instance, of 90-degrees or one-quarter revolution thereof.

It will be understood that the relative proportions of the several described gears and sprockets of the actuating mechanism may be determined readily by one skilled in the art for the accomplishment of the desired co-ordination and synchronization of the co-operating instrumentalities of the machine, hence detailed description of the proportions of such gears and sprockets is here omitted.

In use and operation, the baked loaves, preferably warm and fresh from the oven, are deposited bottom side down on the loading plate 8, each loaf suitably disposed between a pair of the pushers B, each of which latter will engage a loaf for propelling the same to and upon the front end of the feed plate 9, as shown at 279 in Figure 3. The feeders C then engage the loaves so disposed on the feed-plate 9 and, in turn, push or propel the same in feeding movement towards the knives 78.

By reason of the meshing elliptical gears 260, 261, the feeders C have cyclic speed variations, the frequency of which is synchronized with the frequency of arrivals of the successive loaf-loading pushers B upon the feed-plate 9. Such cyclic speed variations may best be understood from Figure 17, the several co-operating parts therein shown being in their respective positions at the completion of their movement in feeding a particular loaf through the slicing mechanism the corresponding feeder C now being located with its teeth 59 in and between the knives 78 and the feeder C being in readiness for the succeeding forwardly upwardly oblique elevational movement imparted as the feeder-carrying lugs 52 ascend with and along the strands of the chains 48 extending from the lower to the upper runs thereof. At such time, the gears 260, 261, preferably are disposed approximately at their intermediate quarter-points, as may be said, the shafts 250 and 262 having then their mean, and substantially equal, speeds, as will be understood, for with corresponding speed likewise actuating the chains 48 and feeders C. Also the crank 294 on the shaft 250 is now disposed at its rear dead center, as will be understood from Figure 17, the shaft 290 and arms 289 being hence in rearward oscillated positions for likewise so disposing the plate 106, the latter being momentarily stationary.

During the next half revolution of the gears 260, 261, the latter pass through their high-speed meshing positions for driving the chains 48 at a variable speed greater than mean speed, thereby causing the particular feeder C in front of the knives 78 to be withdrawn rapidly therefrom, the crank 294 moving to its opposite or front dead center for forwardly shifting the plate 106 into the plane vacated by the ascending feeder C, and the next succeeding loaf, as 280, being advanced or propelled rapidly to, and for engagement of its advancing crusted-side by, the knives 78, the inclined grid fingers 101 serving to lift the loaf under the forwardly shifted but now again stationary hold-down plate 106, as seen in Figure 3.

At such time, the gears 260, 261, are also again at mean-speed positions, the ensuing mean speed or rate of loaf-feeding movement being suitable for slicing the relatively hard or firm crusted-side of the loaf and the loaf-portions contiguous thereto. However, in practice, it is found that such rate of feed is not suitable for slicing the relatively soft and cellular interior portion of the loaf; hence my machine is designed to operate in such manner as to substantially reduce the rate of loaf-feed while the knives 78 are cutting through the central soft tissue-like body of the loaf.

Such objects are consummated during the next half revolution of the gears 260, 261, during which time said gears pass through their low-speed meshing positions, the chains 48 being then actuated at a variable speed less than mean speed, thereby causing the particular feeder C now pushing the loaf 280 through the knives 78 to move at a progressively slower rate as the knives 78 approach to cut through the central portion of the loaf. At such time, however, the lugs 52 of the particular feeder C become radially disposed with respect to the shafts 36, causing the lugs 52 to partake of a crank-like movement having the effect of compensating for the rate of movement of the chains 48, then increasing to mean speed, so that the rate of loaf-feed continues to diminish and the loaf comes substantially to a standstill as the knives 78 emerge through the crusted side of the loaf, the hold-down 106 meanwhile, as the crank 294 reverts to its former rear dead-center, being retracted or rearwardly shifted approximately at the speed of the sliced loaf for, in such manner, effectively preventing displacement of the slices thereof.

During the last described operation, the several parts return to the positions shown in Figure 17, the now fully sliced loaf meanwhile having engaged the previously sliced series of loaves, as 281, then residing on the grid-plate 99, for discharging the end loaf thereof onto the conveyer 123 between a pair of the pushers B', as at 282, the belt 123, however, moving the loaf 282 at approximately the same speed as the pushers B' for depositing the loaf upon the delivery-plate 117. As the loaf engages the plate 117, the latter tends to retard the loaf against the movement of the belt 123 for positioning the loaf squarely across the plate 117, when, the loaf being so disposed on the plate 117, the following pusher B' engages the loaf, as at 283, for transporting or propelling the same to the turn-over E during which time the preceding loaf, as 284, is discharged from the plate 117 onto the then suitably forwardly swung inverter or turn-over E, as shown in Figure 3.

Meanwhile, the wheel F has been rotated a quarter-revolution for upending the previously deposited loaf, as 285, in Figure 9, and at the same time depositing a trayed-loaf, as 286, bottom side down on the conveyer K and concurrently presenting the previously emptied one of the pockets 169 on the front side of the wheel into which latter pocket 169, on occurring rearward swinging actuation of the turn-over E, the loaf 284 is reclinably bottom side outwardly suitably deposited. During the now stationary or rest period of the wheel F, the tray-applying apparatus H acts to deposit a tray G on the bottom side upwardly presented loaf 285, all as previously fully set forth, the conveyer K then removing the loaf 286, as seen in Figure 1, prior to the next or succeeding actuation of the wheel F, and so the machine continues repetitively in actuation.

My machine is uniquely highly adapted for, with speed and facility, slicing a series of baked loaves and positioning the same for application of loaf-containing trays respectively thereto for the purpose of preventing, by reason of such speed and facility in carrying out the operation, undue or excessive loss of moisture and gases from and between the kerfs of the sliced-loaf, in order that the wrapper when applied to the loaf may have the proper effect of preserving the freshness and palatibility of the sliced bread.

It will be seen that my machine accomplishes its several objects in an economical, efficient, and highly practicable manner. It will be understood that the machine may be employed with any suitable form of wrapping machine, inasmuch as the tray applied to the sliced loaf retains the latter in such condition that the wrapping operation may be carried on in the same manner as for a whole or unsliced loaf, the prime desideratum being to drive the slicing-and-traying machine in a positive manner from the wrapping machine for insuring the proper co-ordination of the respective functions thereof.

It will be understood that changes and modifications in the form, construction, arrangement and combination of the several parts of the machine may be made and substituted for those herein shown and described without departing from the nature and principle of my invention.

Having thus described my invention, what I claim and desire to secure by Letters Patent is,—

1. In a baked-loaf slicing machine, in combination, a feed-table for the loaves to be sliced, slicing means comprising a series of spaced blades, a pair of spaced registering endless carriers arranged respectively for travel in upper non-feeding and lower feeding runs above the plane of the table, a series of spaced members supported by and between the carriers for recurrent travel over the table on the feeding runs of the carriers for pushing the loaves successively to the slicing blades, means for guiding said members substantially to and upwardly away from the blades during travel of the carriers from their lower to their upper runs, and series of spaced teeth on said members for projection between the respective blades for propelling the slices therebetween.

2. In a baked-loaf slicing machine, in combination, a feed-table for the loaves to be sliced, slicing means comprising a series of spaced blades, a pair of spaced registering endless carriers arranged respectively for travel in upper non-feeding and lower feeding runs above the plane of the table, a series of spaced members supported by and between the carriers for recurrent travel over the table on the feeding runs of the carriers for pushing the loaves successively to and between the slicing blades, means for guiding said members substantially to and upwardly away from the blades during travel of the carriers from their lower to their upper runs, and means including a series of resilient fingers disposed between the respective blades for retaining the slices from following the upward movement of said members.

3. In a baked-loaf slicing machine, in combination, a feed-table for the loaves to be sliced, slicing means comprising a series of spaced blades, a pair of spaced registering endless carriers arranged respectively for travel in upper non-feeding and lower feeding runs above the plane of the table, a series of spaced members supported by and between the carriers for recurrent travel over the table on the feeding runs of the carriers for pushing the loaves successively to and between the slicing blades, means for guiding said members substantially to and upwardly away from the slicing blades during travel of the carriers from their lower to their upper runs, and a feed plate for the slicing blades including spaced grids disposed between the respective blades and having an upward inclination corresponding to the upward movement of said members to and at the blades.

4. In a baked loaf slicing machine, in combination, a feed-table for the loaves to be sliced, slicing mechanism comprising a series of spaced blades, a pair of spaced registering endless carriers arranged respectively for travel in upper non-feeding and lower feeding runs above the plane of the table, a series of spaced members including cradles swingably supported by and between the carriers and loaf-engaging blocks pivotally mounted on the cradles for recurrent travel thereof over the feed-table on the lower feeding runs of the carriers for pushing the successive loaves to the slicing blades, means for guiding the cradles during travel of the carriers from their lower to their upper runs for obliquely swinging the cradles toward the slicing blades, and means for guiding the blocks pivotally on the oblique cradles for propelling the loaf-slices between the slicing blades.

5. In a baked-loaf slicing machine, in combination, a feed-table for the loaves to be sliced, slicing means comprising a series of spaced blades, a pair of spaced registering endless carriers arranged respectively for travel in upper non-feeding and lower feeding runs above the plane of the table, a series of spaced members pivotally supported by and between said carriers for recurrent travel over the feed table on the lower feeding runs of the carriers, swingable blocks on said members having projecting series of spaced teeth for disposition between the respective slicing blades, means for guiding said members during travel of the carriers from their lower to their upper runs for disposing said members obliquely to the slicing blades, and means for guiding said blocks in tooth-interfitting relation with the slicing blades.

6. In a baked-loaf slicing machine, in combination, a feed-table for the loaves to be sliced, slicing mechanism, a pair of spaced registering endless carriers arranged respectively for travel in upper non-feeding and lower feeding runs above the plane of the table, and a series of spaced members supported by and between the carriers for recurrent travel over the table on the feeding runs of the carriers for feeding the loaves successively to the slicing mechanism, said feeding members each including a cradle swingably connected to the carriers, a loaf-engaging block pivotally mounted on the cradle, and means for normally biasing said block flatwise on the cradle.

7. In a baked loaf slicing machine, in combination, a feed-table for the loaves to be sliced, slicing mechanism comprising a series of spaced blades, means including a series of spaced members arranged for travel over the table for propelling the successive loaves along the table and to the slicing blades, and spaced inwardly shiftable guide-members disposed longitudinally of the path of said members for laterally guiding the loaves, said members having opposed side recesses for accommodating said guides.

8. In a baked loaf slicing machine, in combination, a feed-table for the loaves to be sliced, slicing mechanism comprising a series of spaced blades, a plurality of pairs of rotary drive-members of different diametrical dimension disposed in longitudinally spaced pair relation over the feed-table, a pair of endless carriers arranged to travel on the drive-members in upper non-feeding runs and lower feeding runs over the feed-table, other rotary members disposed below and to the rear of the smaller drive-members for guiding the carriers rearwardly to the slicing blades and thence upwardly and forwardly over said smaller drive-members, and a series of spaced members supported by the carriers for recurrent travel over the table on the feeding runs of the carriers for pushing the loaves successively to the slicing blades.

9. In a baked-loaf slicing machine, in combination, slicing means, means including a series of spaced loaf-engaging members movable progressively toward the slicing means, and means including elliptical gears having meshing co-operation for actuating said feeding members in cyclic speed variations for feeding the respective loaves to and through the slicing means.

10. In a baked-loaf slicing machine, in combination, loaf-slicing means, means for feeding a loaf to and through the slicing means, means including a hold-down member engageable with the loaf for preventing displacement of the loaf-slices, and means for advancing the hold-down member to meet the loaf advancing to the slicing means and for retracting said member with the loaf during the slicing operation.

11. In a baked-loaf slicing machine, in combination, loaf-slicing means, means for feeding a loaf to and through the slicing means, means including a frame resiliently supported and a hold-down member reciprocable in the frame for yielding engagement with the loaf for preventing displacement of the loaf-slices, and means for advancing said member in the frame for meeting a loaf advancing to the slicing and for retracting said member in the frame with the loaf during the slicing operation.

12. In a baked-loaf slicing machine, in combination, slicing means, means including a series of spaced loaf-engaging members movable progressively toward the slicing means, means including elliptical gears having meshing co-operation for actuating said feeding members in cyclic speed variations for feeding the respective loaves to and through the slicing means, and hold-down means reciprocable in loaf-feeding direction responsively to movement of said gears for engaging the sliced loaf emerging from the slicing means.

13. In a baked-loaf slicing machine, in combination, slicing means, means including a series of spaced loaf-engaging members movable progressively toward the slicing means, means including elliptical gears having meshing co-operation for actuating said feeding members in cyclic speed variations for feeding the respective loaves to and through the slicing means, hold-down means reciprocable for engaging the sliced loaf emerging from the slicing means, and means including a crank co-operating with the driven member of said gears for actuating the hold-down means with the loaf in loaf-feeding direction.

14. In a baked-loaf slicing machine, in combination, a feed-plate, a grid-plate in operative alignment with the feed-plate, series of slicing-blades disposed for reciprocation through the grid-plate, and means for feeding the successive loaves along the feed-plate and upon the grid-plate to the blades, said means comprising an endless carrier arranged for travel in a path disposed over the feed-plate and wholly to one side of, and comprising a portion extending obliquely upwardly from the grid-plate and away from, the cutting plane of the blades, and a series of spaced members supported by the carrier for loaf pushing-engagement.

15. In a baked-loaf slicing machine, in combination, a feed-plate, a grid-plate in operative alignment with the feed-plate, series of slicing-blades disposed for reciprocation through the grid-plate, and means for feeding the successive loaves along the feed-plate and upon the grid-plate to the blades, said means comprising an endless carrier arranged for travel in a path disposed over the feed-plate and wholly to one side of, and comprising a portion extending obliquely upwardly from the grid-plate and away from, the cutting plane of the blades, a series of spaced feeders supported for swinging movement by the carrier, and co-operable members for retaining the feeders for loaf-pushing engagement during travel of the carrier in feeding direction.

16. In a baked-loaf slicing machine, in combination, a feed-plate, a grid-plate in operative alignment with the feed-plate, series of slicing-blades disposed for reciprocation through the grid-plate, and means for feeding the successive loaves along the feed-plate and upon the grid-plate to the blades, said means comprising a pair of registering endless carriers spaced laterally of the machine and disposed for travel in a path to one side of, and comprising a portion extending obliquely upwardly from the grid-plate and away from, the cutting plane of the blades, and a series of spaced feeders swingably supported by and disposed between the carriers, the feeders being retained for loaf pushing-engagement during travel of the carriers in feeding direction and swingably guided in the travel of the carriers in non-feeding direction.

17. In a baked-loaf slicing machine, in combination, a horizontal feed-plate, a grid-plate angularly disposed to the feed-plate, series of slicing-blades disposed for reciprocation through the grid-plate, a carrier disposed for travel in a path comprising a portion extending parallel with and over the feed-plate and a portion adjacent to, and extending obliquely upwardly away from, the cutting-plane of the blades, and a series of spaced feeders supported by the carrier for pushing the successive loaves along the feed-plate and up the grid-plate and to and through the blades during travel of the carrier through said portions of its travel.

18. In a baked-loaf slicing machine, in combination, a horizontal feed-plate, a grid-plate angularly disposed to the feed-plate, series of slicing-blades disposed for reciprocation through the grid-plate, a carrier disposed for travel in a path comprising a portion extending parallel with and over the feed-plate and a portion adjacent to, and extending obliquely upwardly away from, the cutting-plane of the blades, and a series of spaced feeders supported by the carrier and each including a block provided with a plurality of teeth for intermeshing engagement with the blades.

19. In a baked-loaf slicing machine, in combination, a feed-plate, a grid-plate operatively disposed to the feed-plate, series of slicing-blades disposed for reciprocation through the grid-plate, a carrier disposed for travel in a path comprising a portion extending parallel with and over the feed-plate and a portion adjacent to, and extending obliquely upwardly away from, the cutting-plane of the blades, a series of spaced feeders supported by the carrier for pushing the successive loaves over the feed and grid-plates and to and through the blades during travel of the carrier through said portions of its travel, and means including a series of resilient fingers disposed between the respective blades for retaining the slices from following the upward movement of the feeders.

20. In a baked-loaf slicing machine, in combination, a horizontal feed-plate, a grid-plate angularly disposed to the feed-plate, series of slicing-blades disposed for reciprocation through the grid-plate, a carrier disposed for travel in a path comprising a portion extending parallel with and over the feed-plate and a portion adjacent to, and extending obliquely upwardly away from, the cutting-plane of the blades, and a series of spaced feeders supported by the carrier for pushing the successive loaves over the feed and grid-plates and to the blades during travel of the carrier through said portions of its travel, the grid-plate having an upward inclination corresponding to the upward movement of the feeders to and at the blades.

21. In a baked-loaf slicing machine, in combination, a horizontal feed-plate, a grid-plate angularly disposed to the feed-plate, series of slicing blades disposed for reciprocation through the grid-plate, a carrier disposed for travel in upper non-feeding and lower feeding runs above the plane of the feed-plate, a series of spaced feeders pivotally supported by the carrier for recurrent travel over the feed-plate on the lower feeding run of the carrier, swingable blocks on the feeders having projecting series of spaced teeth for disposition between the respective slicing-blades, means for guiding the feeders during travel of the carrier from its lower to its upper run for disposing the feeders obliquely to the slicing-blades, and means for guiding said blocks in tooth-interfitting relation with the slicing-blades.

22. A baked-loaf slicing machine comprising, in combination, a feed-plate, a grid-plate in operative alignment with the feed-plate, series of slicing-blades disposed for reciprocation transersely of and through the grid-plate, and means including a connected series of spaced members arranged for travel in a path disposed wholly to one side of the cutting-plane of the blades for feeding a loaf over the feed and grid-plates and then to and through the blades at a progressively diminishing speed as the slicing-blades approach the center of the loaf.

23. A baked-loaf slicing machine comprising, in combination, a feed-plate, a grid-plate in operative alignment with the feed-plate, series of slicing-blades disposed for reciprocation transversely of and through the grid-plate, and means including a connected series of spaced members arranged for travel in a path disposed wholly to one side of the cutting-plane of the blades for feeding a loaf over the feed and grid-plates and then to and through the blades at a variable speed having a diminished rate of loaf-feeding while the blades are at the central portion of the loaf.

24. A baked-loaf slicing machine comprising, in combination, a feed-plate, a grid-plate in operative alignment with the feed-plate, series of slicing-blades disposed for reciprocation transversely of and through the grid-plate, and means including a connected series of spaced members arranged for travel in a path disposed wholly to one side of the cutting-plane of the blades for feeding a loaf over the feed and grid-plates and then to and through the blades, said members having a speed cycle in loaf-feeding direction varying from a loaf-advancing speed greater than mean speed for advancing a loaf to the blades to a loaf-slicing speed less than mean speed for feeding the loaf through the blades.

25. A baked-loaf slicing machine comprising, in combination, a feed-plate, a grid-plate in operative alignment with the feed-plate, series of slicing-blades disposed for reciprocation transversely of and through the grid-plate, and means including a connected series of spaced members arranged for travel in a path disposed wholly to one side of the cutting-plane of the blades for feeding a loaf over the feed and grid-plates and then to and through the blades at a progressively diminishing speed approaching a stand-still at the end of the slicing movement.

26. A baked-loaf slicing machine comprising, in combination, a feed-plate, a grid-plate in operative alignment with the feed-plate, series of slicing-blades disposed for reciprocation transversely of and through the grid-plate, and means including a connected series of spaced members arranged for travel in a path disposed wholly to one side of the cutting-plane of the blades for feeding a loaf over the feed and grid-plates and then to and through the blades at a progressively diminishing speed as the blades pass through the loaf.

27. A baked-loaf slicing machine comprising, in combination, a feed-plate, a grid-plate in operative alignment with the feed-plate, series of slicing-blades disposed for reciprocation transversely of and through the grid-plate, and means including a connected series of spaced members arranged for travel in a path disposed wholly to one side of the cutting-plane of the blades for feeding a loaf over the feed and grid-plates and then to and through the blades at a progressively diminishing speed having lowest rate of loaf-feed at the end of the slicing movement.

28. In a baked-loaf slicing machine, in combination, a feed-plate, a grid-plate in operative alignment with the feed-plate, series of slicing-blades reciprocable transversely of and through the grid-plate, means arranged for travel in a path disposed to one side of the cutting-plane of the blades for feeding a loaf over the feed and grid-plates and to and through the blades, and means including a series of hold-down fingers disposed upon the opposite side of the cutting-plane of the blades and synchronously movable with the loaf relatively to the blades for preventing displacement of the loaf slices during slicing operation.

29. In a baked-loaf slicing machine, in combination, a feed-plate, a grid-plate in operative alignment with the feed-plate, series of slicing blades reciprocable transversely of and through the grid-plate, means arranged for travel in a path disposed to one side of the cutting-plane of the blades for feeding a loaf over the feed and grid-plates and to and through the blades, a series of hold-down fingers disposed upon the opposite side of the cutting-plane of the blades and shiftable for engaging the loaf being sliced for preventing displacement of the loaf slices, and means cooperable with the feeding means for shifting the fingers transversely of the blades and in synchronism with feeding-movement of the loaf.

30. In a baked-loaf slicing machine, in combination, a grid-plate, series of slicing-blades disposed for reciprocation transversely of and through the grid-plate, a feed-plate disposed to one side of the cutting-plane of the blades in operative alignment with the grid-plate, means for feeding the loaves successively over the feed-plate to and through the blades, a delivery table disposed upon the opposite side of the cutting-plane of the blades, a yieldable plate-extension on the grid-plate presented toward the delivery table, a belt in operative alignment with the delivery table for receiving the respective sliced loaves from the plate-extension, and a connected series of members movable under the plate-extension over and with the belt for conveying the sliced loaves successively to the table, said plate-extension being yieldable to movement thereunder of said members.

31. In a baked-loaf slicing machine, in combination, a grid-plate, series of slicing-blades disposed for reciprocation transversely of and through the grid-plate, a delivery table having its front end spaced from and disposed in a plane below the plane of the grid-plate, an apron normally bridging the space between the grid-plate and table, and a connected series of members movable under the apron and over the table for conveying the sliced loaves successively along the table, said apron being yieldable to movement thereunder of said members.

ANTHONY B. TEWES.